United States Patent
Reddy et al.

(10) Patent No.: US 12,493,442 B1
(45) Date of Patent: Dec. 9, 2025

(54) MULTI-USER EXTENDED-REALITY CONTENT

(71) Applicant: QUALCOMM Incorporated, San Diego, CA (US)

(72) Inventors: Varun Amar Reddy, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/821,831

(22) Filed: Aug. 30, 2024

(51) Int. Cl.
*G06F 3/14* (2006.01)
*G06T 19/00* (2011.01)

(52) U.S. Cl.
CPC ............ *G06F 3/1454* (2013.01); *G06T 19/00* (2013.01); *G06T 2219/024* (2013.01)

(58) Field of Classification Search
CPC .............. G02B 27/017; G02B 27/0172; G02B 2027/0178; G02B 27/0176; G02B 2027/0174; G06T 19/006; G06T 2219/024; G06F 3/011; G06F 3/1454
See application file for complete search history.

(56) References Cited

U.S. PATENT DOCUMENTS

| | | | |
|---|---|---|---|
| 11,094,127 B2 * | 8/2021 | McCall | G06V 20/64 |
| 11,500,476 B1 | 11/2022 | Chen et al. | |
| 11,875,080 B2 * | 1/2024 | Su | G02B 27/0101 |
| 2014/0368534 A1 * | 12/2014 | Salter | G06F 3/012 |
| | | | 345/619 |
| 2019/0324277 A1 | 10/2019 | Kohler et al. | |
| 2019/0385370 A1 | 12/2019 | Boyapalle et al. | |
| 2020/0245101 A1 * | 7/2020 | Schober | H04W 4/029 |
| 2021/0056789 A1 * | 2/2021 | Amuduri | G08B 13/22 |
| 2021/0092081 A1 | 3/2021 | Mullins | |
| 2021/0263142 A1 * | 8/2021 | Alwood | G01S 19/54 |
| 2023/0350628 A1 | 11/2023 | Pahud et al. | |

* cited by examiner

*Primary Examiner* — Koosha Sharifi-Tafreshi
(74) *Attorney, Agent, or Firm* — QUALCOMM Incorporated

(57) ABSTRACT

Systems and techniques are described herein for extended reality. For instance, a method for extended reality is provided. The method may include providing common virtual content for display at a first device, the common virtual content viewable at a second device; receiving, at the first device, a radio-frequency (RF) signal from the second device; making one or more measurements of the RF signal; determining relative-position information associated with the first device and the second device based on the one or more measurements; determining that a relative-position condition is satisfied based on the relative-position information; and modifying the common virtual content for display by at least the first device based on the relative-position condition being satisfied.

20 Claims, 10 Drawing Sheets

MULTI-USER EXTENDED-REALITY CONTENT

TECHNICAL FIELD

The present disclosure generally relates to extended reality (XR). For example, aspects of the present disclosure include systems and techniques for modifying XR content based on relative position and/or orientation of multiple XR devices.

BACKGROUND

Extended reality (XR) technologies can be used to present virtual content to users, and/or can combine real environments from the physical world and virtual environments to provide users with XR experiences. The term XR can encompass virtual reality (VR), augmented reality (AR), mixed reality (MR), and the like. XR systems can allow users to experience XR environments by overlaying virtual content onto a user's view of a real-world environment.

For example, an XR head-mounted device (HMD) may include a display that allows a user to view the user's real-world environment through a display of the HMD (e.g., a transparent display). The XR HMD may display virtual content at the display in the user's field of view overlaying the user's view of their real-world environment. Such an implementation may be referred to as "see-through" XR. As another example, an XR HMD may include a scene-facing camera that may capture images of the user's real-world environment. The XR HMD may modify or augment the images (e.g., adding virtual content) and display the modified images to the user. Such an implementation may be referred to as "pass through" XR or as "video see through (VST)." The user can generally change their view of the environment interactively, for example by tilting or moving the XR HMD.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for extended reality. According to at least one example, a method is provided for extended reality. The method includes: providing common virtual content for display at a first device, the common virtual content viewable at a second device; receiving, at the first device, a radio-frequency (RF) signal from the second device; making one or more measurements of the RF signal; determining relative-position information associated with the first device and the second device based on the one or more measurements; determining that a relative-position condition is satisfied based on the relative-position information; and modifying the common virtual content for display by at least the first device based on the relative-position condition being satisfied.

In another example, an apparatus for extended reality is provided that includes at least one memory and at least one processor (e.g., configured in circuitry) coupled to the at least one memory. The at least one processor configured to: provide common virtual content to a display of a first device, wherein the common virtual content is viewable at a second device; determine relative-position information associated with the first device and the second device based on the one or more measurements of a radio frequency (RF) signal received at the first device from the second device; determine that a relative-position condition is satisfied based on the relative-position information; and modify the common virtual content based on the relative-position condition being satisfied.

In another example, a non-transitory computer-readable medium is provided that has stored thereon instructions that, when executed by one or more processors, cause the one or more processors to: provide common virtual content to a display of a first device, wherein the common virtual content is viewable at a second device; determine relative-position information associated with the first device and the second device based on the one or more measurements of a radio frequency (RF) signal received at the first device from the second device; determine that a relative-position condition is satisfied based on the relative-position information; and modify the common virtual content based on the relative-position condition being satisfied.

In another example, an apparatus for extended reality is provided. The apparatus includes: means for providing common virtual content for display at a first device, the common virtual content viewable at a second device; means for receiving, at the first device, a radio-frequency (RF) signal from the second device; means for making one or more measurements of the RF signal; means for determining relative-position information associated with the first device and the second device based on the one or more measurements; means for determining that a relative-position condition is satisfied based on the relative-position information; and means for modifying the common virtual content for display by at least the first device based on the relative-position condition being satisfied.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
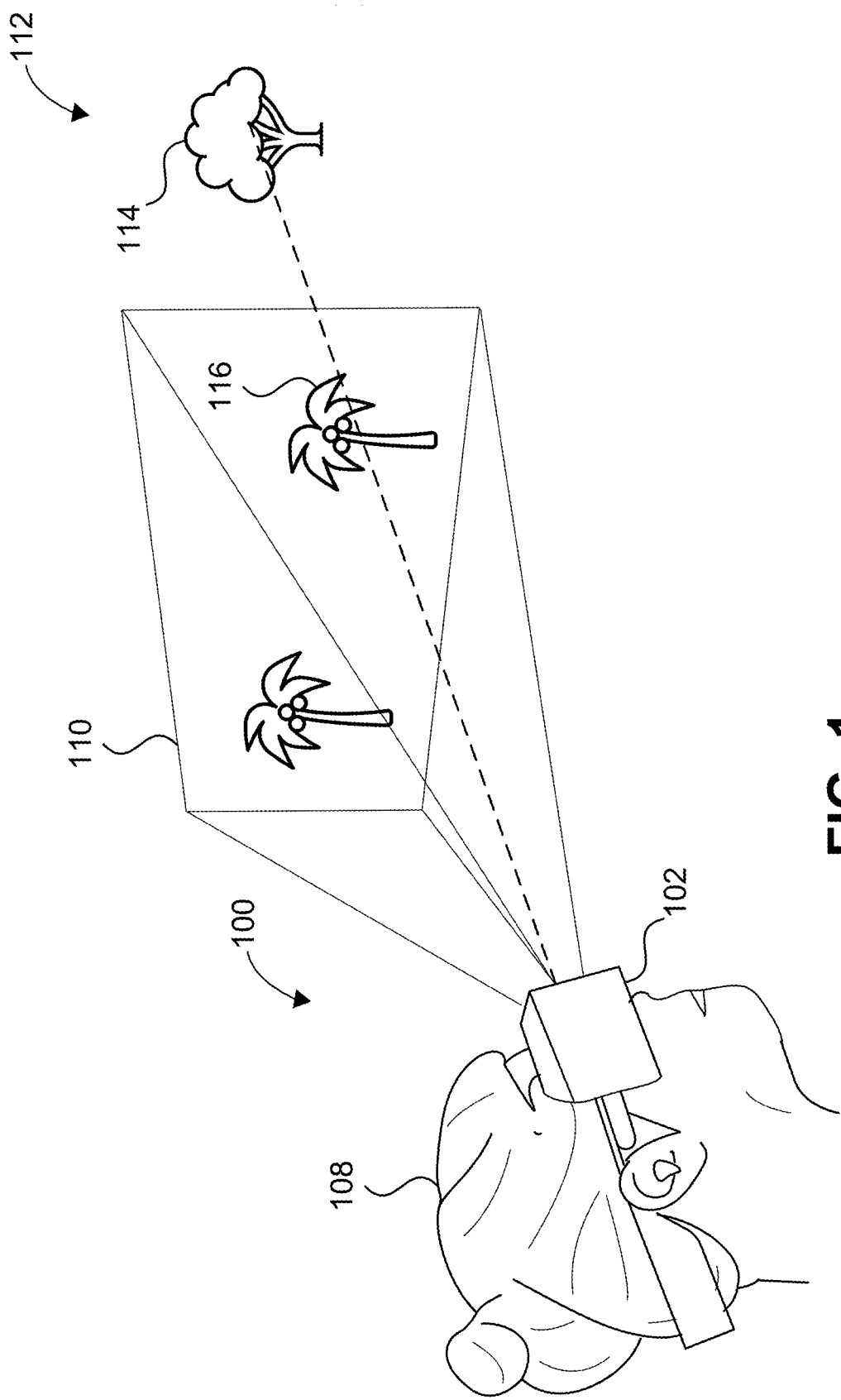
FIG. 1 is a diagram illustrating an example extended-reality (XR) system, according to aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As noted previously, an extended reality (XR) system or device can provide a user with an XR experience by presenting virtual content to the user (e.g., for a completely immersive experience) and/or can combine a view of a real-world or physical environment with a display of a virtual environment (made up of virtual content). The real-world environment can include real-world objects (also referred to as physical objects), such as people, vehicles, buildings, tables, chairs, and/or other real-world or physical objects. As used herein, the terms XR system and XR device are used interchangeably. Examples of XR systems or devices include head-mounted displays (HMDs) (which may also be referred to as head-mounted devices), XR glasses (e.g., AR glasses, MR glasses, etc.) (also referred to as smart or network-connected glasses), among others. In some cases, XR glasses are an example of an HMD. In some cases, an XR system can track parts of the user (e.g., a hand and/or fingertips of a user) to allow the user to interact with items of virtual content.

XR systems can include virtual reality (VR) systems facilitating interactions with VR environments, augmented reality (AR) systems facilitating interactions with AR environments, mixed reality (MR) systems facilitating interactions with MR environments, and/or other XR systems.

For instance, VR provides a complete immersive experience in a three-dimensional (3D) computer-generated VR environment or video depicting a virtual version of a real-world environment. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

MR technologies can combine aspects of VR and AR to provide an immersive experience for a user. For example, in an MR environment, real-world and computer-generated objects can interact (e.g., a real person can interact with a virtual person as if the virtual person were a real person).

An XR environment can be interacted with in a seemingly real or physical way. As a user experiencing an XR environment (e.g., an immersive VR environment) moves in the real world, rendered virtual content (e.g., images rendered in a virtual environment in a VR experience) also changes, giving the user the perception that the user is moving within the XR environment. For example, a user can turn left or right, look up or down, and/or move forwards or backwards, thus changing the user's point of view of the XR environment. The XR content presented to the user can change accordingly, so that the user's experience in the XR environment is as seamless as it would be in the real world.

In some cases, an XR system can match the relative pose and movement of objects and devices in the physical world. For example, an XR system can use tracking information to calculate the relative pose of devices, objects, and/or features of the real-world environment in order to match the relative position and movement of the devices, objects, and/or the real-world environment. In some examples, the XR system can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment. In some cases, an XR system can track parts of the user (e.g., a hand and/or fingertips of a user) to allow the user to interact with items of virtual content.

XR systems or devices can facilitate interaction with different types of XR environments (e.g., a user can use an XR system or device to interact with an XR environment). One example of an XR environment is a metaverse virtual environment. A user may virtually interact with other users (e.g., in a social setting, in a virtual meeting, etc.), virtually shop for items (e.g., goods, services, property, etc.), to play computer games, and/or to experience other services in a metaverse virtual environment. In one illustrative example, an XR system may provide a 3D collaborative virtual environment for a group of users. The users may interact with one another via virtual representations of the users in the virtual environment. The users may visually, audibly, haptically, or otherwise experience the virtual environment while interacting with virtual representations of the other users.

A virtual representation of a user may be used to represent the user in a virtual environment. A virtual representation of a user is also referred to herein as an avatar. An avatar representing a user may mimic an appearance, movement, mannerisms, and/or other features of the user. In some examples, the user may desire that the avatar representing the person in the virtual environment appear as a digital twin of the user. In any virtual environment, it is important for an XR system to efficiently generate high-quality avatars (e.g., realistically representing the appearance, movement, etc. of the person) in a low-latency manner. It can also be important for the XR system to render audio in an effective manner to enhance the XR experience.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

Systems, apparatuses, electronic devices, methods (also referred to as processes), and computer-readable media (collectively referred to herein as "systems and techniques") are described herein for modifying XR content based on relative position and/or orientation of multiple XR devices. For example, the systems and techniques may modify XR content viewed by a first user via a first XR device based on a position (e.g., location) and/or orientation of a second XR device of a second user. In some aspects, the XR content may be common virtual content, viewable at both the first XR device and the second XR device.

For example, a first user located in a particular location in an environment (e.g., a room, a building, a park, etc.) may be viewing XR content on an XR device of the first user (e.g., the first XR device). A second user may be using an XR device of the second user (e.g., the second XR device). The second user may arrive at the location in the environment. The second XR device may transmit a radio-frequency (RF) signal (e.g., an Institute of Electrical and Electronics Engineers (IEEE) 802.11 (WiFi) signal, a Bluetooth® signal, an ultra-wideband (UWB) signal, a new radio sidelink (NR-SL) signal, etc.). The first XR device may receive the RF signal and determine a direction and/or distance (e.g., a range) between the first XR device and the second XR device based on the RF signal. Additionally or alternatively, the first XR device may determine an orientation of the second XR device. For example, the first XR device may determine a direction in which the second XR device is facing. In some cases, the first XR device may include a directional antenna (or multiple antennae) that may be used to determine an angle of arrival of the RF signal. Additionally or alternatively, the first XR device may determine a distance between the first XR device and the second XR device based on a signal strength of the RF signal or based on a delay between the sending and the receipt of the RF signal. Additionally or alternatively, the second XR device may include a directional antenna and/or multiple antennae and the first XR device may determine an orientation of the second XR device (e.g., relative to the first XR device) based on a signal strength of the RF signal.

The first XR device may determine whether a condition is satisfied based on the direction and/or distance between the first XR device and the second XR device and/or based on the orientation of the second user device. If the condition is satisfied, the first XR device may modify XR content being displayed by the first XR device.

In one illustrative example, the first user may be in a public park viewing a tree. When the second user approaches the first user, the first XR device may determine that a condition is satisfied. For example, the first XR device may determine that the condition is satisfied based on the second XR device being within a range threshold (e.g., coming within a threshold distance) from the first XR device. Based on the condition being satisfied, the first XR device may alter an appearance of the tree in the field of view of the first user such that, to the first user, the tree appears to change color, size, shape, etc.

In some cases, the first XR device may modify the XR content based on a position (or location) and/or orientation of the second XR device relative to the first XR device. For instance, continuing with the illustrative example from above, the first XR device may alter the color of the tree (in the view of the first user) based on a distance between the first XR device and the second XR device (e.g., by making the tree redder as the second XR device approaches the first XR device). As another example, the first XR device may alter the appearance of the tree (in the view of the first user) based on an angular direction between the first XR device and the second XR device. For instance, if the second XR device is in front of the first XR device (from the perspective of the first XR device) the first XR device may display the tree at a first size and if the second XR device is behind of the first XR device the first XR device may display the tree at a second size. As another example, the first XR device may alter the appearance of the tree (in the view of the first user) based on an orientation of the second XR device. For example, the first XR device may display the tree at various sizes depending on an angle between the direction the second XR device is facing and the direction between the first XR device and the second XR device. For example, if the second XR device is facing toward the first XR device, the first XR device may display the tree as large and if the second XR device is facing away from the first XR device, the first XR device may display the tree as small.

Further, in some cases, the first XR device may modify the XR content based on a position (or location) and/or orientation of the second XR device relative to environment as perceived by the first XR device. For example, the first XR device may determine a position of an object or point in the environment (e.g., a tree) relative to the first XR device. The first XR device may determine a position and/or orientation of the second XR device relative to the first XR device. The first XR device may relate the position of the object or point to the position of the second XR device and modify the XR content based on the relationship. For example, the first XR device may display a tree with different colors based on how close the second XR device is to the tree. As an example, the first XR device may display a tree with different colors based on whether the second XR device is facing the tree or away from the tree.

Additionally or alternatively, the first XR device may send a signal indicative of the satisfaction of the condition to the second XR device. The second XR device may modify content being displayed by the second XR device based on the indication of the satisfaction of the condition. For instance, the first XR device may determine that a condition is satisfied based on the second XR device coming within a threshold distance from the tree. As another example, the first XR device may determine that a condition is satisfied based on the second XR device facing (within an angular threshold) toward the tree. The first XR device may inform the second XR device of the satisfaction of the condition. Based on the information from the first XR device, the second XR device may alter an appearance of the tree in the field of view of the second user or display a message to the second user.

Additionally or alternatively, the first XR device may send an RF signal to the second XR device. The second XR device may determine a direction and/or distance between the second XR device and the first XR device and/or an orientation of the first XR device. The second XR device may determine whether a condition is satisfied based on the direction and/or distance between the second XR device and the first XR device (and/or the orientation of the first XR device) and modify content being displayed by the second XR device based on the satisfaction of the condition. For instance, the first user may be in a public park viewing a tree. When the second user approaches the tree (within a threshold distance), the second XR device may determine that a condition is satisfied and alter an appearance of the tree in the field of view of the second user or display a message to the second user.

In some aspects, the first XR device and the second XR device may coordinate regarding the XR content displayed by each of the first XR device and the second XR device. For example, the first XR device may send, to the second XR device, a signal indicative of XR content being displayed by the first XR device. The second XR device may determine information to display based on the XR content being displayed by the first XR device. The XR content displayed by each of the devices may be coordinated (e.g., merged), for example, the same objects may be displayed by both the first XR device and the second XR device. The first XR device may display the XR content from the perspective of the first XR device and the second XR device may display the XR content from the perspective of the second XR device. For example, the first and second XR devices may display a tree of the same color, but the tree may be displayed by the first and second XR devices differently depending on the positions of the first and second XR devices relative to the tree.

In some cases, the first and second XR devices may alter XR content displayed by one of both of the XR devices to match or correspond to the XR content displayed by the other of the XR devices. For example, before the second XR device approaches a tree, the first XR device may display an oak tree and the second XR device may display a maple tree. Coordination between the first and second XR devices may include causing both XR devices to display an oak tree, a maple tree, an elm tree, or a hybrid.

Further, in some aspects, the degree of coordination (and/or merging) between the XR content displayed by the XR devices may be determined based on the relative position of the XR devices and/or orientations of the XR devices. For example, the closer the two XR devices are to one another, the more the XR content may be coordinated (or merged). For example, as the second XR device approaches the first XR device, the coordination may increase, for instance causing the second XR device to display the tree in a color that matches the color displayed by the first XR device. As an example, as the two XR devices are facing in the same direction, coordination of the XR content may increase.

Additionally, the first XR device may receive a number of RF signals from a number of XR devices. The first XR device may determine respective relative positions of the number of XR devices. The first XR device may determine whether a condition is satisfied based on the number of XR devices. For instance, the first XR device may determine that the condition is satisfied by a count of XR devices that are proximate to (e.g., within a threshold distance of) the tree (and/or proximate to the first XR device) exceeding a numerical threshold. For example, twelve XR devices within 50 meters of the tree may satisfy the condition.

Additionally or alternatively, a device may determine positions and/or orientations (e.g., relative positions and/or orientations) of one or more XR devices and provide an indication of XR content to the XR devices based on the determined positions and/or orientations. For example, a device, such as a billboard, screen, poster case, moving billboard, etc. may receive RF signals from one or more XR devices. The device may determine a direction and/or distance between each of the one or more XR devices and the device, and/or an orientation of each of the one or more XR devices. The device may determine XR content or a modification of XR content to display based on the positions of the one or more XR devices and/or the orientation of each of the one or more XR devices. The device may provide the XR devices with an indication of the XR content or the modification. The XR devices may display the XR content or modify XR content based on the indication.

For instance, a billboard may determine that 200 XR devices are within 100 meters of the billboard. Further, the billboard may determine that 50 of the XR devices are oriented toward the billboard. Based on the 50 XR devices that are within 100 meters of the billboard and oriented toward the billboard exceeding a numerical threshold, the billboard may determine to provide XR content to the XR devices (e.g., the XR content may include a phase such as "there are 50 users looking at this deal for a movie and only 10 spots remain!"). The XR devices that receive the XR content may display the XR content to their respective users, such as by overlaying the billboard, in the view of the users, with the XR content. Additionally or alternatively, the billboard may change information displayed by the billboard in the real world based on the positions and/or orientations of the XR devices.

As another example, an exhibit in a museum may determine that 10 XR devices are in the same room as the exhibit and that the 10 XR devices are oriented toward the exhibit. The exhibit may determine to begin an XR content presentation (e.g., causing the XR devices to display images and/or play sound) to the 10 users based on the 10 XR devices being in the room and being oriented toward the exhibit. Alternatively, based on 8 XR devices being in the room with the exhibit, the exhibit may provide a message to the XR devices of the 8 users, the message may include a phrase like "waiting for 2 more patrons."

Various aspects of the application will be described with respect to the figures below.

FIG. 1 is a diagram illustrating an example extended-reality (XR) system 100, according to aspects of the disclosure. As shown, XR system 100 includes an XR device 102. XR device 102 may implement, as examples, image-capture, object-detection, object-tracking, gaze-tracking, view-tracking, localization (e.g., determining a location of XR device 102), pose-tracking (e.g., tracking a pose of XR device 102), content-generation, content-rendering, computational, communicational, and/or display aspects of extended reality, including virtual reality (VR), augmented reality (AR), and/or mixed reality (MR).

For example, XR device 102 may include one or more scene-facing cameras that may capture images of a scene 112 in which a user 108 uses XR device 102. XR device 102 may detect objects (e.g., object 114) in scene 112 based on the images of scene 112. In some aspects, XR device 102 may include one or more user-facing cameras that may capture images of eyes of user 108. XR device 102 may determine a gaze of user 108 based on the images of user 108. In some aspects, XR device 102 may determine an object of interest (e.g., object 114) in scene 112 (e.g., based on the gaze of user 108, based on object recognition, and/or based on a received indication regarding object 114). XR device 102 may obtain and/or render XR content 116 (e.g., text, images, and/or video) for display at XR device 102. XR device 102 may display XR content 116 to user 108 (e.g., within a field of view 110 of user 108). In some aspects, XR content 116 may be based on the object of interest. For example, XR content 116 may be an altered version of object 114. In some aspects, XR device 102 may display XR content 116 in relation to the view of user 108 of the object of interest. For example, XR device 102 may overlay XR content 116 onto object 114 in field of view 110. In any case, XR device 102 may overlay XR content 116 (whether related to object 114 or not) onto the view of user 108 of scene 112.

In a "see-through" configuration, XR device 102 may include a transparent surface (e.g., optical glass) such that XR content 116 may be displayed on (e.g., by being projected onto) the transparent surface to overlay the view of user 108 of scene 112 as viewed through the transparent surface. In a "pass-through" configuration or a "video see-through" configuration, XR device 102 may include a scene-facing camera that may capture images of scene 112. XR device 102 may display images or video of scene 112, as captured by the scene-facing camera, and XR content 116 overlaid on the images or video of scene 112.

In various examples, XR device 102 may be, or may include, a head-mounted device (HMD), a virtual reality headset, and/or smart glasses. XR device 102 may include one or more cameras, including scene-facing cameras and/or user-facing cameras, a GPU, one or more sensors (e.g., such as one or more inertial measurement units (IMUs), image sensors, and/or microphones), one or more communication units (e.g., wireless communication units), and/or one or more output devices (e.g., such as speakers, headphones, displays, and/or smart glass).

Figure 2:
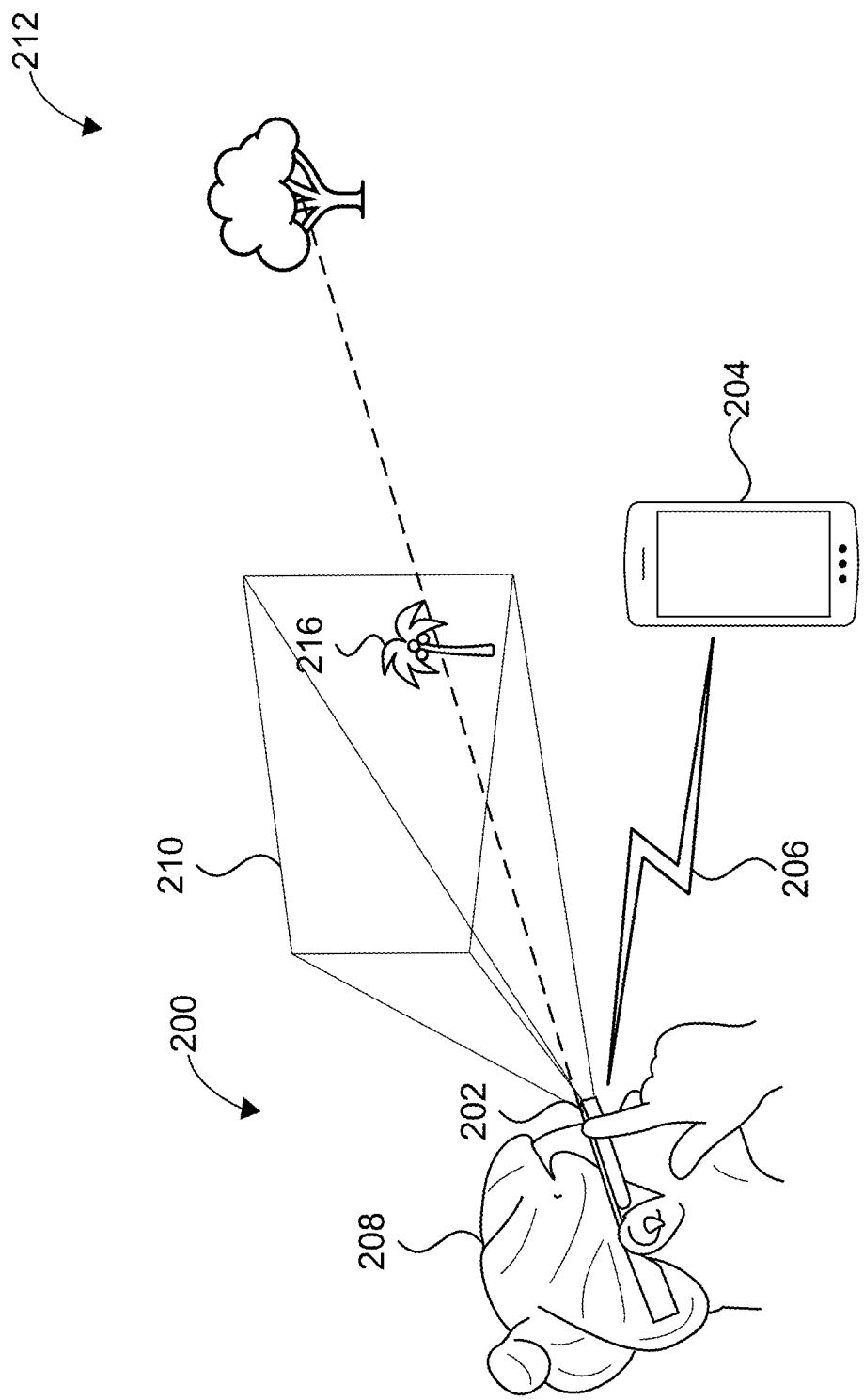
FIG. 2 is a diagram illustrating another example extended reality (XR) system, according to aspects of the disclosure.

FIG. 2 is a diagram illustrating an example extended reality (XR) system 200, according to aspects of the disclosure. In some aspects, an XR device or system may be, or may include, two or more devices. For example, XR system 200 includes a display device 202 and a processing device 204. Display device 202 and processing device 204 implement a communication link 206 between display device 202 and processing device 204. Display device 202 and processing device 204 may collectively implement as examples, image-capture, object-detection, object-tracking, gaze-tracking, view-tracking, localization, pose-tracking, content-generation, content-rendering, computational, communicational, and/or display aspects of XR. For example, display device 202 may implement image-capture, gaze-tracking, view-tracking, localization, pose-tracking, communicational, and/or display aspects of XR. Processing device 204 may implement object-detection, object-tracking, localization, content-generation, content-rendering, computational, and/or communicational, aspects of XR.

For example, display device 202 may capture and/or generate data, such as image data (e.g., from user-facing cameras and/or scene-facing cameras) and/or motion data (from an inertial measurement unit (IMU)). Display device 202 may provide the data to processing device 204, for example, through communication link 206. Processing device 204 may process the data and/or other data (e.g., data received from another source). For example, processing device 204 may detect, recognize, and/or track objects in scene 212 based on the images of scene 212. Further, processing device 204 may generate (or obtain) XR content 216 to be displayed at display device 202. Processing device 204 may render XR content 216 to be appropriate for display at display device 202 (e.g., based on a pose of display device 202). Processing device 204 may provide XR content 216 to display device 202 through communication link 206 and display device 202 may display XR content 216 in field of view 210 of user 208.

In various examples, display device 202 may be, or may include, a head-mounted display (HMD), a virtual reality headset, and/or smart glasses. Display device 202 may include one or more cameras, including scene-facing cameras and/or user-facing cameras, a GPU, one or more sensors (e.g., such as one or more inertial measurement units (IMUs), image sensors, and/or microphones), and/or one or more output devices (e.g., such as speakers, headphones, displays, and/or smart glass). Processing device 204 may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof. Communication link 206 may be a wireless connection according to any suitable wireless protocol, such as, for example, Institute of Electrical and Electronics Engineers (IEEE) 802.11 (Wi-Fi), IEEE 802.15, or Bluetooth®. In some cases, communication link 206 may be a direct wireless connection between display device 202 and processing device 204. In other cases, communication link 206 may be through one or more intermediary devices, such as, for example, routers or switches and/or across a network.

Figure 3:
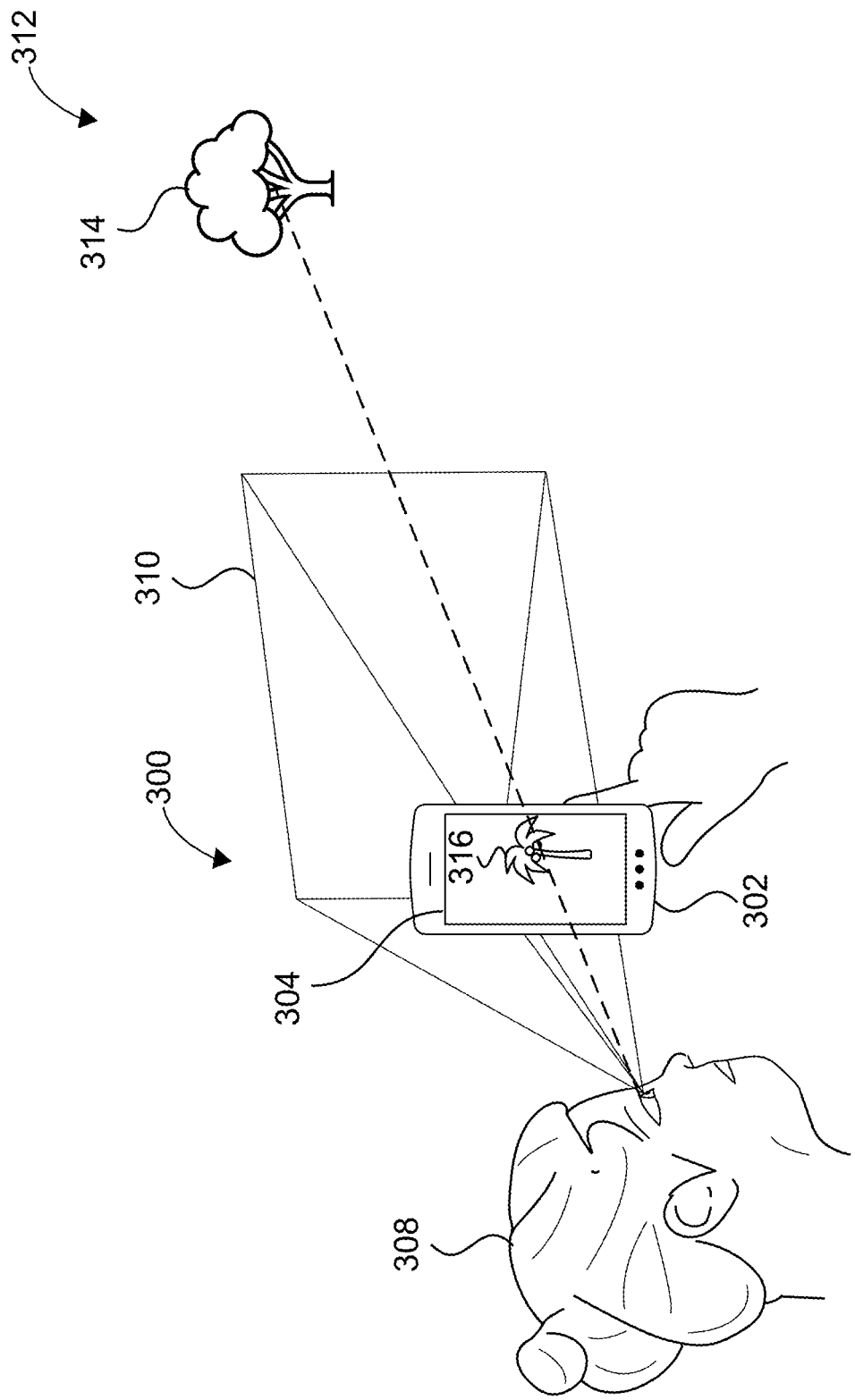
FIG. 3 is a diagram illustrating yet another example extended-reality (XR) system, according to aspects of the disclosure.

FIG. 3 is a diagram illustrating an example extended-reality (XR) system 300, according to aspects of the disclosure. As shown, XR system 300 includes an XR device 302 including a display 304. In some cases, XR device 302 may implement, as examples, image-capture, object-detection, object-tracking, gaze-tracking, view-tracking, localization, pose-tracking, content-generation, content-rendering, computational, communicational, and/or display aspects of XR.

For example, XR device 302 may include one or more scene-facing cameras that may capture images of a scene 312 in which a user 308 uses XR device 302. XR device 302 may detect objects (e.g., object 314) in scene 312 based on the images of scene 312. In some aspects, XR device 302 may include one or more user-facing cameras that may capture images of eyes of user 308. XR device 302 may determine a gaze of user 308 and/or a field of view 310 of user 308 based on the images of user 108. In some aspects, XR device 302 may determine an object of interest (e.g., object 314) in scene 312 (e.g., based on the gaze of user 308, based on object recognition, and/or based on a received indication regarding object 314). XR device 302 may obtain and/or render XR content 316 (e.g., text, images, and/or video) for display at display 304. XR device 302 may display XR content 316 to user 308 (e.g., within a field of view 310 of user 308). In some aspects, XR device 302 may determine a position of display 304 relative to field of view 310 of user 308 and scene 312. XR device 302 may track the pose of XR device 302 relative to user 308, field of view 310, and scene 312 such that XR content 316 aligns in field of view 310 of user 308 with scene 312. In some aspects, XR device 302 may capture images at a scene-facing camera and display the images at display 304. XR device 302 may overlay XR content 316 onto the images captured by the scene-facing camera and displayed at display 304. In some aspects, XR content 316 may be based on the object of interest. For example, XR content 316 may be an altered version of object 314. In some aspects, XR device 302 may display XR content 316 in relation to the view of user 308 of the object of interest. For example, XR device 302 may overlay XR content 316 onto object 314 in field of view 310. In any case, XR device 302 may overlay XR content 316 (whether related to object 314 or not) onto the view of user 308 of scene 312.

XR device 302 may operate in in a "pass-through" configuration or a "video see-through" configuration. For example, XR device 302 may include a scene-facing camera that may capture images of the scene of user 308. XR device 302 may display images or video of the scene, as captured by the scene-facing camera, and overlay XR content 316 onto the images or video of the scene. XR device 302 may display the information to be viewed by user 308 in field of view 310 of user 308. In a "see-through" configuration, XR device 302 may include a transparent surface (e.g., optical glass) such that information may be displayed on the transparent surface to overlay the information onto the scene as viewed through the transparent surface.

XR device 302 and/or display 304 may be, or may include, a handheld device, a smartphone, a tablet, or another computing device with a display. XR device 302 include one or more cameras, including scene-facing cameras and/or user-facing cameras, a GPU, one or more sensors (e.g., such as one or more inertial measurement units (IMUs), image sensors, and/or microphones), and/or one or more output devices (e.g., such as speakers, display, and/or smart glass).

Figure 4:
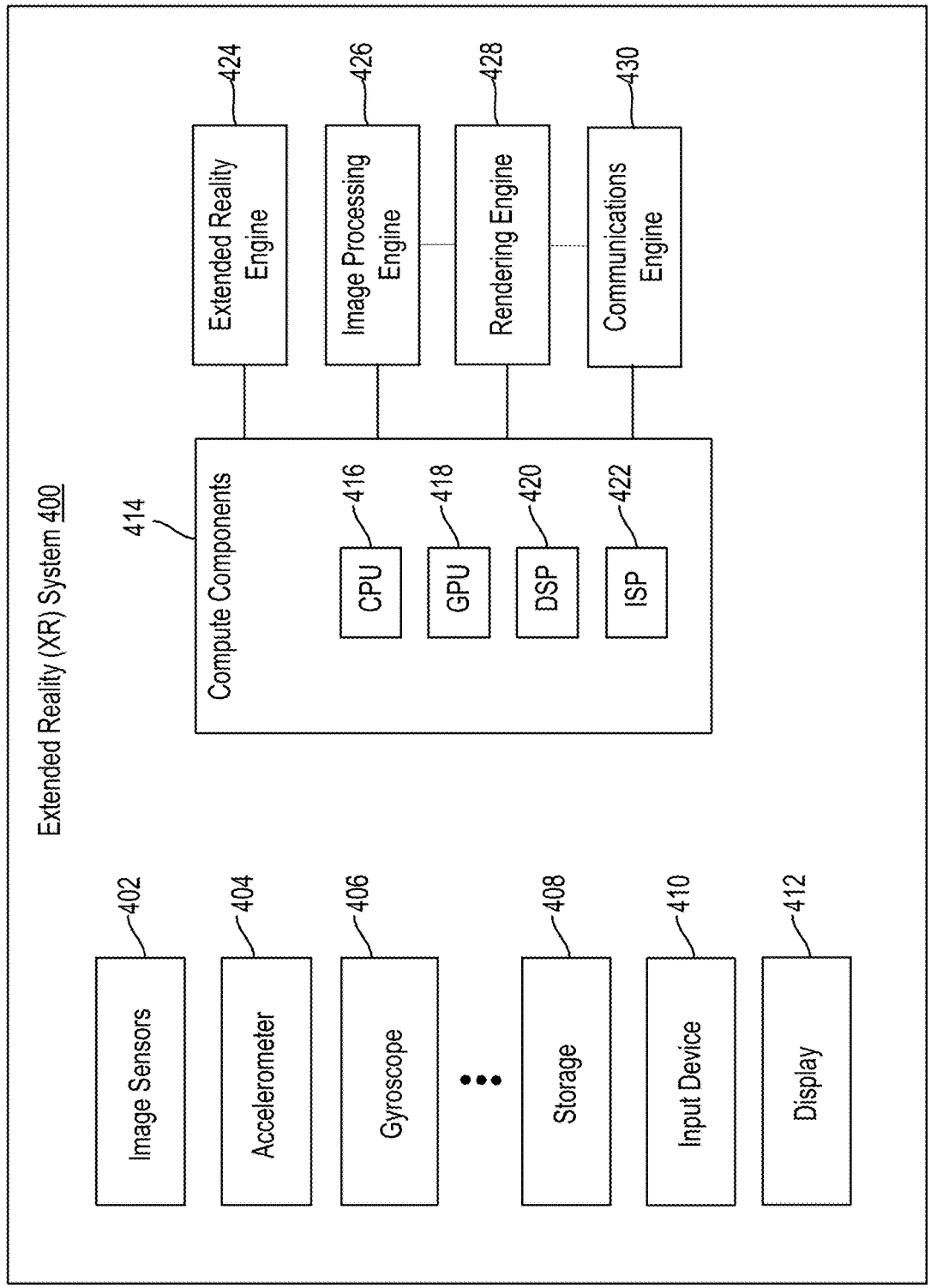
FIG. 4 is a block diagram illustrating an architecture of an example extended reality (XR) system, in accordance with some aspects of the disclosure.

FIG. 4 is a diagram illustrating an architecture of an example extended reality (XR) system 400, in accordance with some aspects of the disclosure. XR system 400 may execute XR applications and implement XR operations. XR system 400 may be an example of, or be included in, any of XR device 102 of FIG. 1, display device 202 and/or processing device 204 of FIG. 2, and/or XR device 302 of FIG. 3.

In this illustrative example, XR system 400 includes one or more image sensors 402, an accelerometer 404, a gyroscope 406, storage 408, an input device 410, a display 412, Compute components 414, an XR engine 426, an image processing engine 428, a rendering engine 430, and a communications engine 432. It should be noted that the components 402-432 shown in FIG. 4 are non-limiting examples provided for illustrative and explanation purposes, and other examples may include more, fewer, or different components than those shown in FIG. 4. For example, in some cases, XR system 400 may include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 4. While various components of XR system 400, such as image sensor 402, may be referenced in the singular form herein, it should be understood that XR system 400 may include multiple of any component discussed herein (e.g., multiple image sensors 402).

Display 412 may be, or may include, a glass, a screen, a lens, a projector, and/or other display mechanism that allows a user to see the real-world environment and also allows XR content to be overlaid, overlapped, blended with, or otherwise displayed thereon.

XR system 400 may include, or may be in communication with, (wired or wirelessly) an input device 410. Input device 410 may include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, image sensor 402 may capture images that may be processed for interpreting gesture commands.

XR system 400 may also communicate with one or more other electronic devices (wired or wirelessly). For example, communications engine 432 may be configured to manage connections and communicate with one or more electronic devices. In some cases, communications engine 432 may correspond to communication interface 826 of FIG. 8.

In some implementations, image sensors 402, accelerometer 404, gyroscope 406, storage 408, display 412, compute components 414, XR engine 426, image processing engine 428, and rendering engine 430 may be part of the same computing device. For example, in some cases, image sensors 402, accelerometer 404, gyroscope 406, storage 408, display 412, compute components 414, XR engine 426, image processing engine 428, and rendering engine 430 may be integrated into an HMD, extended reality glasses, smartphone, laptop, tablet computer, gaming system, and/or any other computing device. However, in some implementations, image sensors 402, accelerometer 404, gyroscope 406, storage 408, display 412, compute components 414, XR engine 426, image processing engine 428, and rendering engine 430 may be part of two or more separate computing devices. For instance, in some cases, some of the components 402-432 may be part of, or implemented by, one computing device and the remaining components may be part of, or implemented by, one or more other computing devices. For example, such as in a split perception XR system, XR system 400 may include a first device (e.g., an HMD), including display 412, image sensor 402, accelerometer 404, gyroscope 406, and/or one or more compute components 414. XR system 400 may also include a second device including additional compute components 414 (e.g., implementing XR engine 426, image processing engine 428, rendering engine 430, and/or communications engine 432). In such an example, the second device may generate virtual content based on information or data (e.g., images, sensor data such as measurements from accelerometer 404 and gyroscope 406) and may provide the virtual content to the first device for display at the first device. The second device may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Storage 408 may be any storage device(s) for storing data. Moreover, storage 408 may store data from any of the components of XR system 400. For example, storage 408 may store data from image sensor 402 (e.g., image or video data), data from accelerometer 404 (e.g., measurements), data from gyroscope 406 (e.g., measurements), data from compute components 414 (e.g., processing parameters, preferences, virtual content, rendering content, scene maps, tracking and localization data, object detection data, privacy data, XR application data, face recognition data, occlusion data, etc.), data from XR engine 426, data from image processing engine 428, and/or data from rendering engine 430 (e.g., output frames). In some examples, storage 408 may include a buffer for storing frames for processing by compute components 414.

Compute components 414 may be, or may include, a central processing unit (CPU) 416, a graphics processing unit (GPU) 418, a digital signal processor (DSP) 420, an image signal processor (ISP) 422, a neural processing unit (NPU) 424, which may implement one or more trained neural networks, and/or other processors. Compute components 414 may perform various operations such as image enhancement, computer vision, graphics rendering, extended reality operations (e.g., tracking, localization, pose estimation, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, compute components 414 may implement (e.g., control, operate, etc.) XR engine 426, image processing engine 428, and rendering engine 430. In other examples, compute components 414 may also implement one or more other processing engines.

Image sensor 402 may include any image and/or video sensors or capturing devices. In some examples, image sensor 402 may be part of a multiple-camera assembly, such as a dual-camera assembly. Image sensor 402 may capture image and/or video content (e.g., raw image and/or video data), which may then be processed by compute components 414, XR engine 426, image processing engine 428, and/or rendering engine 430 as described herein.

In some examples, image sensor 402 may capture image data and may generate images (also referred to as frames) based on the image data and/or may provide the image data or frames to XR engine 426, image processing engine 428, and/or rendering engine 430 for processing. An image or frame may include a video frame of a video sequence or a still image. An image or frame may include a pixel array representing a scene. For example, an image may be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, image sensor 402 (and/or other camera of XR system 400) may be configured to also capture depth information. For example, in some implementations, image sensor 402 (and/or other camera) may include an RGB-depth (RGB-D) camera. In some cases, XR system 400 may include one or more depth sensors (not shown) that are separate from image sensor 402 (and/or other camera) and that may capture depth information. For instance, such a depth sensor may obtain depth information independently from image sensor 402. In some examples, a depth sensor may be physically installed in the same general location or position as image sensor 402, but may operate at a different frequency or frame rate from image sensor 402. In some examples, a depth sensor may take the form of a light source that may project a structured or textured light pattern, which may include one or more narrow bands of light, onto one or more objects in a scene. Depth information may then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

XR system 400 may also include other sensors in its one or more sensors. The one or more sensors may include one or more accelerometers (e.g., accelerometer 404), one or more gyroscopes (e.g., gyroscope 406), and/or other sensors. The one or more sensors may provide velocity, orientation, and/or other position-related information to compute components 414. For example, accelerometer 404 may detect acceleration by XR system 400 and may generate acceleration measurements based on the detected acceleration. In some cases, accelerometer 404 may provide one or more translational vectors (e.g., up/down, left/right, forward/back) that may be used for determining a position or pose of XR system 400. Gyroscope 406 may detect and measure the orientation and angular velocity of XR system 400. For example, gyroscope 406 may be used to measure the pitch, roll, and yaw of XR system 400. In some cases, gyroscope 406 may provide one or more rotational vectors (e.g., pitch, yaw, roll). In some examples, image sensor 402 and/or XR engine 426 may use measurements obtained by accelerometer 404 (e.g., one or more translational vectors) and/or gyroscope 406 (e.g., one or more rotational vectors) to calculate the pose of XR system 400. As previously noted, in other examples, XR system 400 may also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors may include at least one IMU. An IMU is an electronic device that measures the specific force, angular rate, and/or the orientation of XR system 400, using a combination of one or more accelerometers, one or more gyroscopes, and/or one or more magnetometers. In some examples, the one or more sensors may output measured information associated with the capture of an image captured by image sensor 402 (and/or other camera of XR system 400) and/or depth information obtained using one or more depth sensors of XR system 400.

The output of one or more sensors (e.g., accelerometer 404, gyroscope 406, one or more IMUs, and/or other sensors) can be used by XR engine 426 to determine a pose of XR system 400 (also referred to as the head pose) and/or the pose of image sensor 402 (or other camera of XR system 400). In some cases, the pose of XR system 400 and the pose of image sensor 402 (or other camera) can be the same. The pose of image sensor 402 refers to the position and orientation of image sensor 402 relative to a frame of reference (e.g., with respect to a field of view 110 of FIG. 1). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from image sensor 402 to track a pose (e.g., a 6DoF pose) of XR system 400. For example, the device tracker can fuse visual data (e.g., using a visual tracking solution) from the image data with inertial data from the measurements to determine a position and motion of XR system 400 relative to the physical world (e.g., the scene) and a map of the physical world. As described below, in some examples, when tracking the pose of XR system 400, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of XR system 400 within the scene and the 3D map of the scene, etc. The 3D map can provide a digital representation of a scene in the real/physical world. In some examples, the 3D map can anchor position-based objects and/or content to real-world coordinates and/or objects. XR system 400 can use a mapped scene (e.g., a scene in the physical world represented by, and/or associated with, a 3D map) to merge the physical and virtual worlds and/or merge virtual content or objects with the physical environment.

In some aspects, the pose of image sensor 402 and/or XR system 400 as a whole can be determined and/or tracked by compute components 414 using a visual tracking solution based on images captured by image sensor 402 (and/or other camera of XR system 400). For instance, in some examples, compute components 414 can perform tracking using computer vision-based tracking, model-based tracking, and/or simultaneous localization and mapping (SLAM) techniques. For instance, compute components 414 can perform SLAM or can be in communication (wired or wireless) with a SLAM system (not shown). SLAM refers to a class of techniques where a map of an environment (e.g., a map of an environment being modeled by XR system 400) is created while simultaneously tracking the pose of a camera (e.g., image sensor 402) and/or XR system 400 relative to that map. The map can be referred to as a SLAM map, and can be three-dimensional (3D). The SLAM techniques can be performed using color or grayscale image data captured by image sensor 402 (and/or other camera of XR system 400), and can be used to generate estimates of 6DoF pose measurements of image sensor 402 and/or XR system 400. Such a SLAM technique configured to perform 6DoF tracking can be referred to as 6DoF SLAM. In some cases, the output of the one or more sensors (e.g., accelerometer 404, gyroscope 406, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 402 (and/or other camera) to the SLAM map. For example, 6DoF SLAM can use feature point associations from an input image to determine the pose (position and orientation) of the image sensor 402 and/or XR system 400 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 402 and/or the XR system 400 can be determined by projecting features from the 3D SLAM map into an image or video frame and updating the camera pose from verified 2D-3D correspondences.

In one illustrative example, the compute components 414 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 414 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 400 can also track the hand and/or fingers of the user to allow the user to interact with and/or control virtual content in a virtual environment. For example, the XR system 400 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 5A:
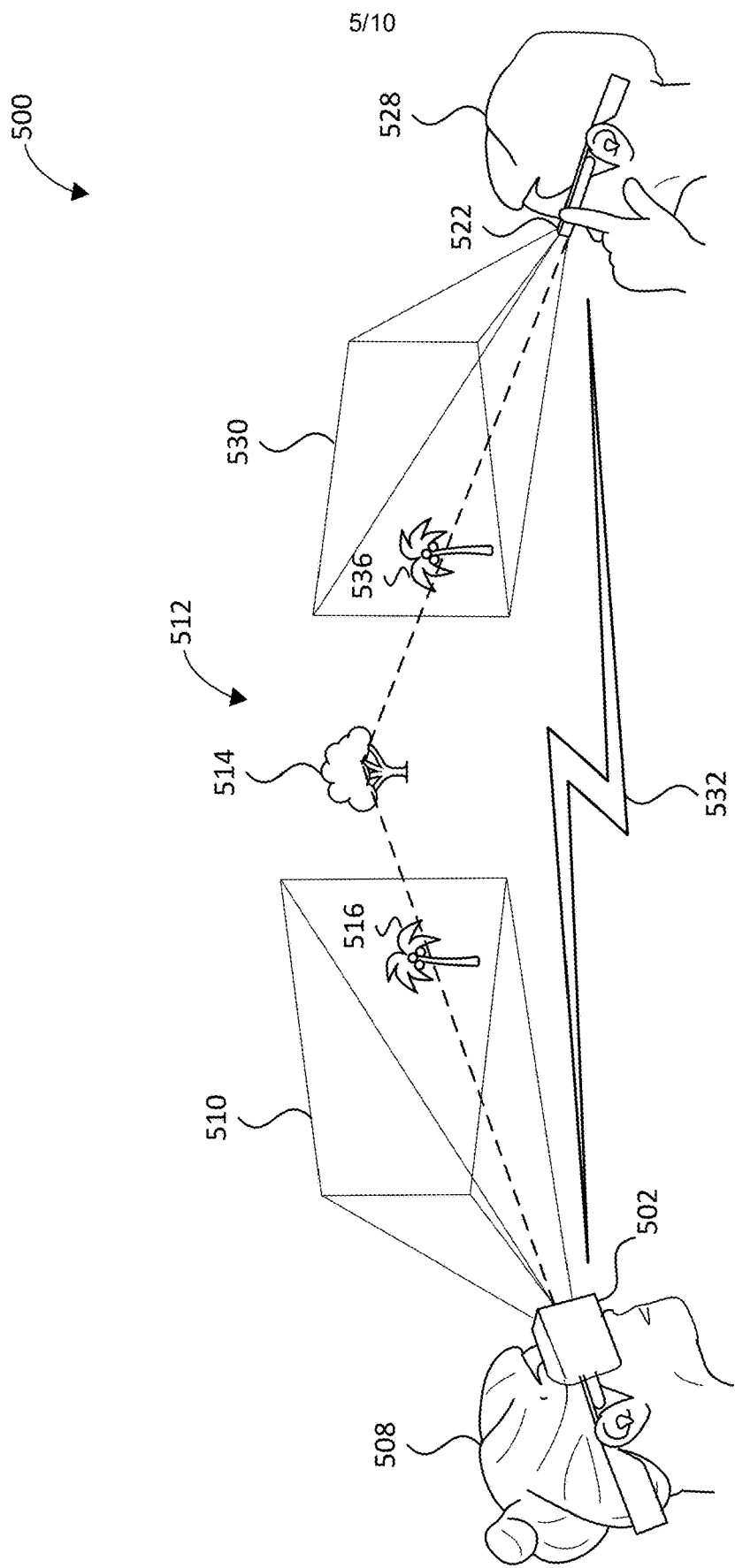
FIG. 5A is a diagram illustrating an example XR system including two XR devices that may display XR content, according to various aspects of the present disclosure.

FIG. 5A is a diagram illustrating an example XR system 500 including two XR devices that may display XR content, according to various aspects of the present disclosure. For example, a user 508 and a user 528 may view a scene 512. User 508 may use an XR device 502 to view XR content 516 (e.g., overlaid onto the view of user 508 of scene 512) and user 528 may use XR device 522 to view XR content 536 (e.g., overlaid onto the view of user 528 of scene 512).

There may be a relationship between XR content 516 and XR content 536. For example, XR content 516 and XR content 536 may be common virtual content. In the present disclosure, the term "common," in reference to virtual content (e.g., the term "common virtual content"), may refer to a relationship between virtual content to be displayed by two separate XR devices. For example, XR content 516 and XR content 536 may be common virtual content because XR content 516 and XR content 536 may be based on the same virtual object or the same class of virtual object. For instance, XR content 516 and XR content 536 may both be representations of a virtual tree. A "tree" may be a class of virtual object. Other example classes of virtual objects include people, characters, vehicles, buildings, various items of furniture, such as tables, chairs, couches, etc. Additionally or alternatively, XR content 516 and XR content 536 may be common virtual content based on XR content 516 and XR content 536 both being displayed in the same location within scene 512. XR content 516 and XR content 536 may both be displayed at the same location within scene 512 as viewed from the different perspectives of XR device 502 and XR device 522. In other words, because XR content 516 and XR content 536 may be related to each other, in terms of the both XR content 516 and XR content 536 being the same virtual object, the same class of virtual object, and/or having the same location within scene 512, the XR content 516 and XR content 536 may be common virtual content, and the common virtual content at the first XR device 502 is viewable at a second device 522.

XR content 516 and XR content 536 may represent different views of the same virtual content at the same location within scene 512. For example, XR device 502 may render XR content 516 as a view of a tree from a perspective of XR device 502 and XR device 522 may render XR content 536 as a view of the same tree from the perspective of XR device 522.

In some aspects, XR content 516 and XR content 536 may represent different virtual objects at the same location within scene 512. In some aspects, though the virtual objects may be different, the virtual objects may be of the same class of virtual object or may share characteristics. For example, XR content 516 may represent a first tree (e.g., a palm tree) and XR content 536 may represent a second tree (e.g., a pine tree). XR device 502 may display the first tree from a perspective of XR device 502 and XR device 522 may display the second tree from a perspective of XR device 522. In some aspects, the virtual objects may be different yet may share the same location. For example, XR content 516 may appear to user 508 as a tree at a location within scene 512 and XR content 536 may appear to user 528 as a building at the same location within scene 512.

XR device 502 and XR device 522 may have common information to generate and display common virtual content. In some aspects, XR device 502 and XR device 522 may be running the same application that may provide the common virtual content to both XR device 502 and XR device 522. For example, the application may include a virtual object anchored to a geographic location. Any XR device that is running the application and is in the environment of the geographic location may view the virtual object.

Additionally or alternatively, XR device 502 and XR device 522 may communicate. For example, XR device 502 may communicate with XR device 522 directly, for example, through Bluetooth®, new-radio sidelink (NR-SL), or other forms of wireless communication. Additionally or alternatively, XR device 502 may communicate with XR device 522 using a network, for example, an Institute of Electrical and Electronics Engineers (IEEE) 802.11 ("WiFi") network, a local-area network (LAN), a wide-area network (WAN), a cellular network, or another communications network. XR device 502 and XR device 522 may exchange information about common virtual content. For example, XR device 502 may send a message to XR device 522 indicating a virtual object, a class of virtual object, characteristics of the virtual object, and/or a location of the virtual object. XR device 502 may display XR content 516 based on the virtual object, the characteristics of the virtual object, and the location of the virtual object (e.g., a representation of the virtual object, having the characteristics, at the location). XR device 522 may generate and display XR content 536 based on the virtual object, the class of virtual object, the characteristics of the virtual object, and the location of the virtual object as indicated by the received message.

According to various aspects of the present disclosure, XR device 502 may modify XR content 516 based on the position of XR device 522 (e.g., relative to XR device 502). Additionally or alternatively, XR device 522 may modify XR content 536 based on the position of XR device 502 relative to XR device 522. Although the description that follows focuses on XR device 502 modifying XR content 516 based on the position of XR device 522, it should be understood that XR device 522 may make modifications to XR content 536 based on the position of XR device 502.

Figure 5B:
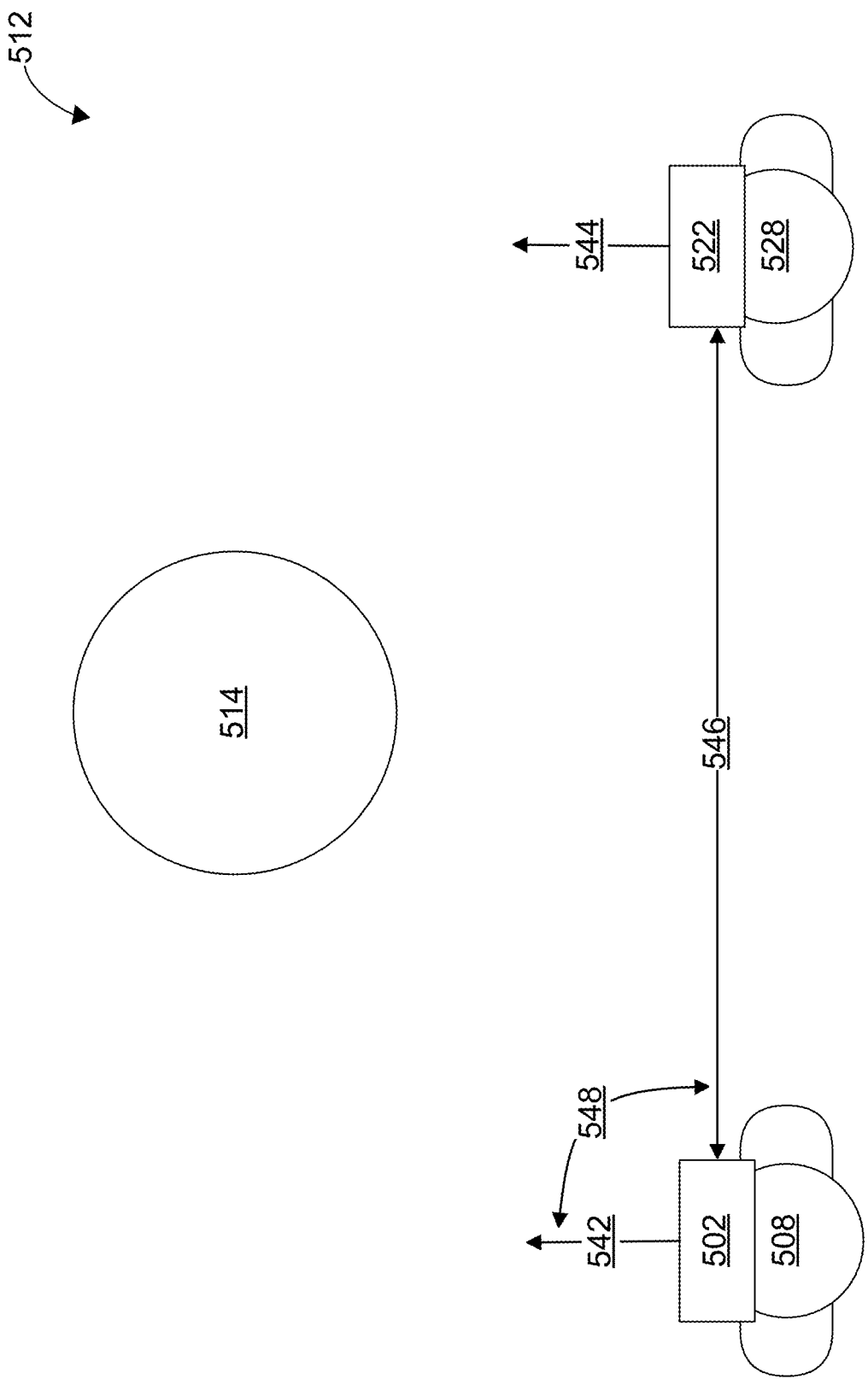
FIG. 5B is a diagram illustrating a top-down view of a scene including users using user devices, according to various aspects of the present disclosure.

FIG. 5B is a diagram illustrating a top-down view of scene 512 including user 508 using XR device 502 and user 528 using XR device 522, according to various aspects of the present disclosure. FIG. 5B illustrates a range 546 between XR device 502 and XR device 522, a direction 548 between XR device 502 and XR device 522 (from the perspective of XR device 502), an orientation 542 of XR device 502, and an orientation 544 of XR device 522.

XR device 522 may transmit a radio frequency (RF) signal 532. For example, XR device 522 may continuously, or at intervals, broadcast RF signal 532. RF signal 532 may be, or may include, a WiFi signal, a Bluetooth® signal, an ultra-wideband (UWB) signal, a new radio sidelink (NR-SL) signal, etc. XR device 502 may receive RF signal 532. XR device 502 may also transmit an RF signal that may be received by XR device 522.

XR device 502 may determine direction 548 and/or range 546 between XR device 502 and XR device 522 based on RF signal 532. For example, XR device 502 may include one or more directional antennae (or multiple antennae) that may be used to determine an angle of arrival of RF signal 532 at XR device 502. Additionally or alternatively, the XR device 502 may determine range 546 between XR device 502 and XR device 522 based on a signal strength of RF signal 532 and/or based on a delay between the sending and the receipt of RF signal 532.

Additionally or alternatively, XR device 502 may determine orientation 544 of XR device 522 (e.g., relative to XR device 502) based on RF signal 532. For example, the XR device 502 may determine a direction in which XR device 522 is facing. For instance, XR device 522 may include one or more directional antennae and/or multiple antennae and XR device 502 may determine orientation 544 of the XR device 522 (e.g., relative to XR device 502) based on a signal strength of the RF signal.

XR device 502 may modify XR content 516 based on the position of XR device 522 (e.g., relative to XR device 502). For example, XR device 502 may determine whether a condition is satisfied based on direction 548 and/or range 546 between XR device 502 and XR device 522 and/or based on orientation 544 of XR device 522. If the condition is satisfied, XR device 502 may modify XR content 516.

In one illustrative example, user 508 may be in a public park viewing an object 514. User 528 may also be in the public park. XR device 502 may receive RF signal 532 from XR device 522. XR device 502 may determine direction 548 and/or range 546 between XR device 502 and XR device 522. Additionally or alternatively, XR device 502 may determine orientation 544 of XR device 522. User 528 may approach user 508. When user 528 approaches user 508, user XR device 502 may determine that a condition is satisfied based on receiving RF signal 532 from XR device 522. For example, XR device 502 may determine that the condition is satisfied based on XR device 522 being within a threshold range (e.g., coming within a threshold distance) of XR device 502. As another example, XR device 502 may determine that the condition is satisfied based on XR device 522 being at a direction 548 from XR device 502. As another example, XR device 502 may determine that the condition is satisfied based on XR device 522 facing (within an angular threshold) towards a specific orientation (e.g., facing towards XR device 502 or object 514). As yet another example, XR device 502 may determine that the condition is satisfied based on XR device 522 being at a given position (either relative to XR device 502 or relative to scene 512). Based on the condition being satisfied, XR device 502 may modify XR content 516, for example, to alter an appearance of object 514 in the field of view of user 508 such that, to user 508, object 514 appears to change color, size, shape, etc.

In some cases, XR device 502 may modify XR content 516 based on a position (or location) and/or orientation of XR device 522 (e.g., relative to XR device 502). For instance, XR device 502 may modify the color of XR content 516 based on range 546 between XR device 502 and XR device 522 (e.g., by making object 514 appear redder as the XR device 522 approaches XR device 502). For example, XR device 502 may set the color of XR content 516 as function of range 546.

As another example, XR device 502 may modify XR content 516 based on direction 548 between XR device 502 and XR device 522. For instance, XR device 522 is in front of XR device 502 (from the perspective of XR device 502), XR device 502 may display an object of XR content 516 at a first size and if XR device 522 is behind of XR device 502, XR device 502 may display an object of XR content 516 at a second size.

As yet another example, XR device 502 may alter XR content 516 based on orientation 542 of XR device 522. For example, XR device 502 may display an object of XR content 516 at various sizes depending on orientation 544 that XR device 522 is facing and/or an angle between orientation 544 and orientation 542. For example, if XR device 522 is facing toward XR device 502 (or object 514), XR device 502 may display the object of XR content 516 at a larger size than if XR device 522 is facing away from XR device 502.

Additionally or alternatively, in some cases, XR device 502 may modify XR content 516 based on a position (or location) and/or orientation of XR device 522 relative to scene 512 as perceived by the first XR device. For example, XR device 502 may determine a position of object 514 or a point in scene 512 (either relative to XR device 502 or relative to a reference coordinate system, such as latitude and longitude). XR device 502 may determine a position and/or orientation 544 of XR device 522 relative to XR device 502 based on RF signal 532. XR device 502 may relate the position of XR device 522 to the position of object 514 or the point in scene 512 and modify XR content 516 based on the relationship. For example, XR device 502 may display an object of XR content 516 anchored to the position of object 514 or to the point in scene 512. XR device 502 may modify the object of XR content 516, for example, giving the object different colors, based on how close XR device 522 is to the position of object 514 or the point in scene 512. As another example, XR device 502 may display an object with different colors based on whether XR device 522 is facing toward the object or away from object 514 or the point in scene 512.

In some aspects, XR device 502 may communicate the modification of XR content 516 with XR device 522 such that XR device 522 may modify XR content 536 to maintain a relationship between XR content 516 and XR content 536. For example, XR device 502 may send a signal indicative of the satisfaction of the condition to XR device 522. XR device 522 may modify XR content 536 based on the indication of the satisfaction of the condition. For instance, XR device 502 may determine that a condition is satisfied based on XR device 522 coming within a threshold distance from object 514. As another example, XR device 502 may determine that a condition is satisfied based on XR device 522 facing (within an angular threshold) toward object 514. XR device 502 may inform XR device 522 of the satisfaction of the condition. Based on the information from XR device 502, XR device 522 may modify XR content 536, for example, to modify an appearance of object 514 in the field of view of user 528 or to display a message to user 508.

Additionally or alternatively, XR device 502 may send an RF signal to XR device 522. XR device 522 may determine a direction and/or distance between XR device 522 and XR device 502 and/or an orientation of XR device 502. XR device 522 may determine whether a condition is satisfied based on the direction and/or distance between XR device 522 and XR device 502 (and/or the orientation of XR device 502) and modify XR content 536 based on the satisfaction of the condition. For instance, user 508 may be in a public park viewing an object 514. User 528 may also be in the public park. XR device 522 may receive an RF signal from XR device 502. XR device 522 may determine a direction and/or range between XR device 522 and XR device 502. Additionally or alternatively, XR device 522 may determine an orientation of XR device 502. User 528 may approach user 508. When user 528 approaches user 508, user XR device 522 may determine that a condition is satisfied based on receiving the RF signal from XR device 502. For example, XR device 522 may determine that the condition is satisfied based on XR device 502 being within a threshold range (e.g., coming within a threshold distance) of XR device 522. Based on the condition being satisfied, XR device 522 may modify XR content 536, for example, to alter an appearance of object 514 in the field of view of user 528 such that, to user 528, the object appears to change color, size, shape, etc. For another example, XR device 522 may determine that the condition is satisfied based on XR device 502 being within a threshold range (e.g., coming within a threshold distance) of XR device 522, and XR device 522 may relay the XR content 516 or other XR content at the XR device 502 to the XR device 522.

In some aspects, XR device 502 and XR device 522 may coordinate regarding XR content 516 and XR content 536 and/or regarding modifications to XR content 516 and XR content 536. For example, XR device 502 may transmit a message indicative of XR content 516. XR device 522 may receive the message and determine XR content 536 based on XR content 516. Additionally or alternatively, XR device 502 may send a message indicative of a modification to XR content 516, XR device 522 may receive the message and modify XR content 536 based on the modification of XR content 536.

In some aspects, XR device 502 and XR device 522 may communicate regarding XR content 516 and XR content 536. In some cases, XR device 502 may determine XR content 516 based on XR content 536 (e.g., such that XR content 516 matches XR content 536). Similarly, in some cases, XR device 522 may determine XR content 536 based on XR content 516 (e.g., such that XR content 536 matches XR content 516).

In some cases, XR device 502 may merge XR content 516 with XR content 536 and/or XR device 522 may merge XR content 536 with XR content 516, for example, such that the same virtual content is displayed by both XR device 502 and XR device 522. XR device 502 may display the virtual content from the perspective of XR device 502 and XR device 522 may display the virtual content from the perspective of XR device 522. For example, XR device 502 and XR device 522 may both display the same tree, but the tree may be displayed by XR device 502 and XR device 522 differently depending on the relative positions of XR device 502 and XR device 522 to the point in scene 512 at which the tree is displayed.

In some cases, XR device 502 may alter XR content 516 to match XR content 536 and/or XR device 522 may alter XR content 536 to match XR content 516. For example, before XR device 522 approaches XR device 502, XR device 502 may display a pine tree anchored to object 514 and XR device 522 may display an apple tree anchored to object 514. In some aspects, XR device 502 (and/or XR device 522) merge XR content 516 and XR content 536 such that XR device 502 (and/or XR device 522) display a pine tree, an apple tree, or a hybrid between a pine tree and an apple tree (e.g., a pineapple plant), or another object, such as an elm tree. For example, XR device 522 may send a message to XR device 502 indicative of XR content 536. XR device 502 may modify XR content 516 to merge XR content 516 with XR content 536. Additionally or alternatively, XR device 502 may send a message to XR device 522 indicative of XR content 516 and XR device 522 may modify XR content 536 to merge XR content 536 with XR content 516.

In some aspects, the degree of coordination (and/or merging) between XR content 516 and XR content 536 may be determined based on position and/or orientation of XR device 522 (e.g., relative to the XR device 502), e.g., range 546, direction 548, and/or orientation 544. For example, the closer XR device 522 is to XR device 502, the more XR device 502 and/or XR device 522 may coordinate (or merge) XR content 516 and XR content 536. For example, as XR device 522 approaches XR device 502, the coordination may increase, for instance causing XR device 502 to display the tree in a color that matches the color displayed by the XR device 522. As another example, as XR device 502 and XR device 522 are facing in the same direction, or toward a common point in scene 512, coordination of XR content 516 and XR content 536 may increase.

In an illustrative example, XR content 516 may include a jug of water held by user 508 while XR content 536 may include an empty glass held by user 528. Based on their relative locations and orientations, XR content 516 and XR content 536 may present a game where the goal is for user 508 and user 528 to cooperatively pour water from the jug into the glass. XR content 516 may further include the glass held by user 528 and XR content 536 may further include the jug held by user 508. As user 508 and user 528 come close and make pouring motions, XR content 516 and XR content 536 may include water pouring from jug to glass.

Additionally, XR device 502 may determine respective positions of a number of XR devices and determine whether a condition is satisfied based on positions of the number of XR devices. For example, XR device 502 may receive a number of RF signals from a number of XR devices to determine the respective relative positions of the number of XR devices. For instance, XR device 502 may determine that the condition is satisfied by a count of XR devices that are proximate to (e.g., within a threshold distance of) object 514 or the XR device 502 exceeding a numerical threshold. For example, XR device 502 may determine that the condition is satisfied based on twelve XR devices being within 50 meters of object 514. In addition, a count of XR devices that are proximate to (e.g., within a threshold distance of) object 514 or the XR device 502 may be displayed, e.g., in association with the XR content 516 or by a new XR content. Additionally or alternatively, a new XR content may be displayed on the XR device 502 if the count of XR devices that are proximate to (e.g., within a threshold distance of) object 514 or the XR device 502 exceeds a numerical threshold.

In an illustrative example, a number of people, each wearing an XR device, may join an XR game, such as "king of the hill," or "capture the flag." The XR devices of the number of people may determine and/or track locations of others of the XR devices. The XR game may provide rules and/or conditions that trigger various results. For example, an XR "king of the hill" game may determine a location as a "hill" and prompt the people to move to the "hill." The various XR devices may determine when XR devices are in the "hill" and change XR content of the XR devices, for example, displaying a timer or a score or altering the appearance of the "hill" in the view of the people. For example, if people from one team are in the "hill" without members of the opposite team in the hill, the "hill" may change color in the view of the people and a counter may be displayed in the view of all of the people.

In some aspects, the XR content may be generated and/or rendered at XR device 502 and/or XR device 522. Additionally or alternatively, the XR content may be, or may include, XR content generated and/or rendered at another device, for example, an XR server. XR device 502 and/or XR device 522 may communicate with an XR server and may obtain XR content from the XR server.

In some aspects, XR device 502 and XR device 522 may signal one another. In some aspects, XR device 502 and/or XR device 522 may implement a discovery protocol (e.g., by broadcasting beacons, such as Bluetooth® beacons). Such beacons may facilitate the exchange and negotiation of capabilities (such as RF technologies available, types of location measurements supported, such as time of arrival (ToA), angle of arrival (AoA)) and/or information regarding XR device 502 and XR device 522, such as make and/or model. In some aspects, XR device 502 and XR device 522 may exchange location information. For example, XR device 502 and XR device 522 may determine their respective locations and provide each other with indications of their respective locations. Additionally or alternatively, XR device 502 and XR device 522 may exchange acknowledge and/or negative acknowledgement (ACK/NACK) messages.

In some aspects, XR device 502 may determine a location of XR device 522 periodically. Additionally or alternatively, XR device 502 may determine a location of XR device 522 based on a change or request, such as, from an application running at XR device 502. For example, XR device 502 may experience a change related to XR content of XR device 502. Based on the change related to the XR content, XR device 502 may determine a location of XR device 522. Additionally or alternatively, based on a change in the pose (e.g., position and orientation) of XR device 502 (e.g., determined using an IMU of XR device 502), XR device 502 may determine a location of XR device 522.

Figure 6A:
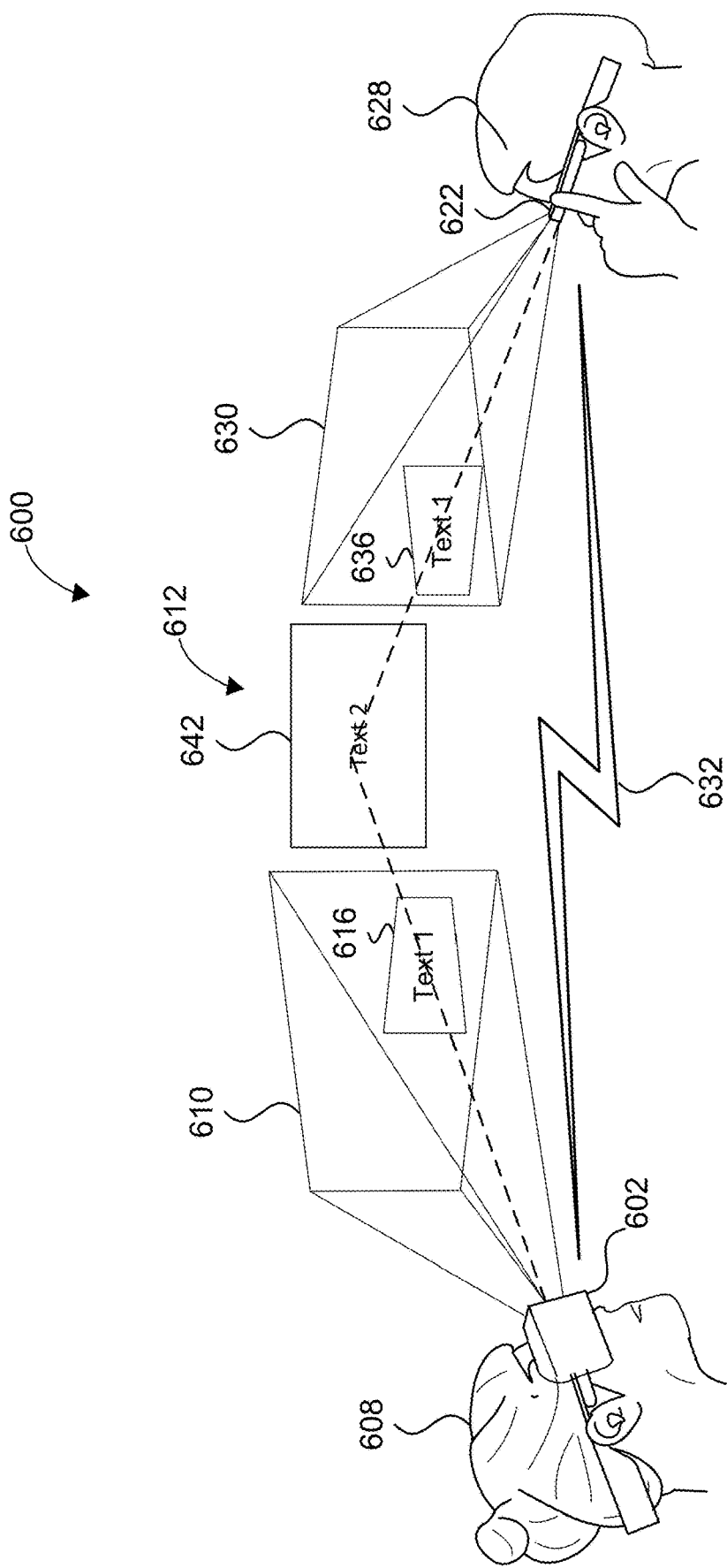
FIG. 6A is a diagram illustrating an example XR system including three XR devices, two of which may display XR content, according to various aspects of the present disclosure.

FIG. 6A is a diagram illustrating an example XR system 600 including three XR devices, two of which may display XR content, according to various aspects of the present disclosure. For example, a user 608 and a user 628 may view a scene 612. User 608 may use an XR device 602 to view XR content 616 (e.g., overlaid onto the view of user 608 of scene 612) and user 628 may use XR device 622 to view XR content 636 (e.g., overlaid onto the view of user 628 of scene 612). A device 642 may be in scene 612 and may provide messages regarding XR content to XR device 602 and/or XR device 622.

Figure 6B:
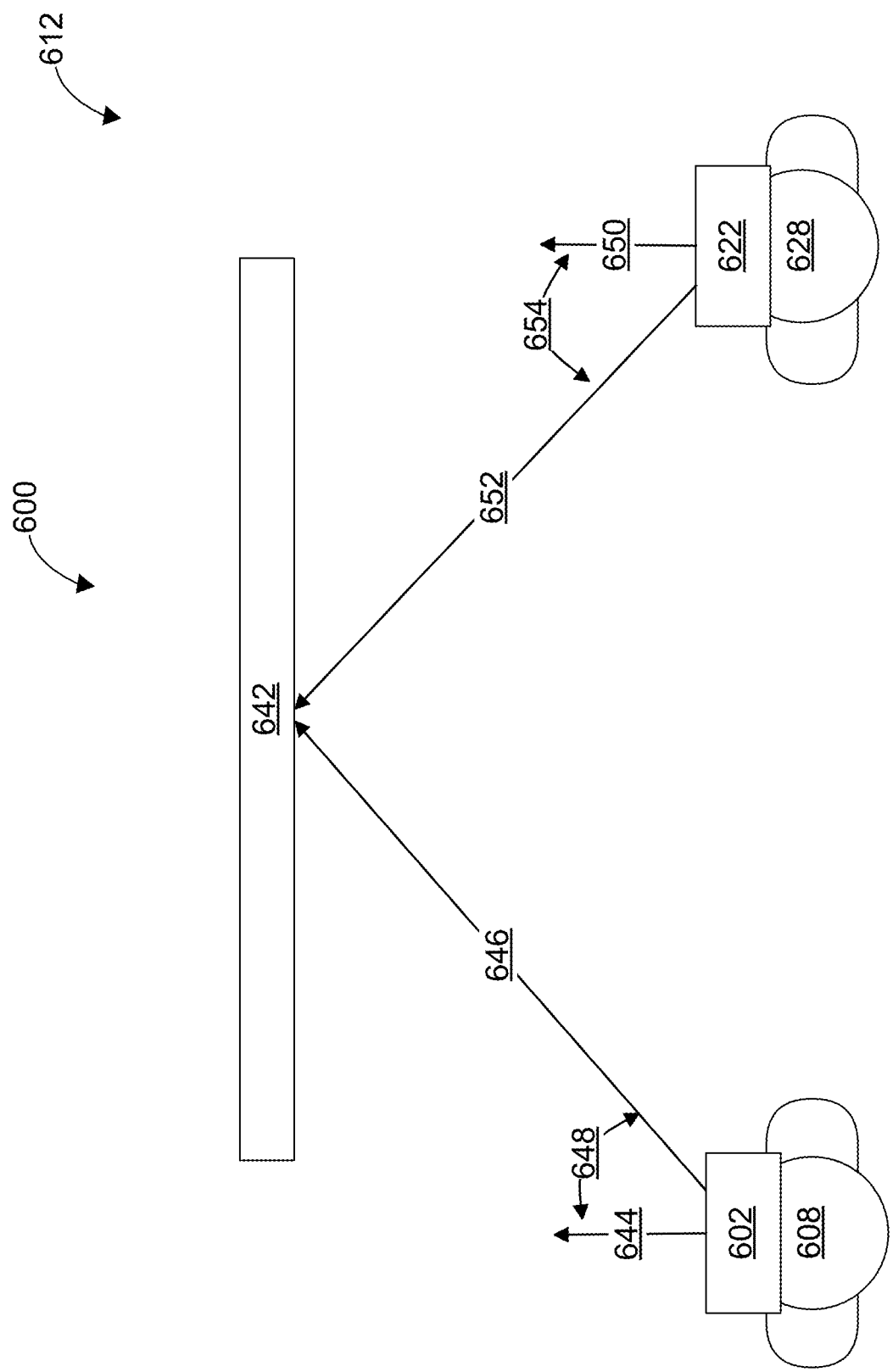
FIG. 6B is a diagram illustrating a top-down view of a scene including users using user devices, according to various aspects of the present disclosure.

FIG. 6B is a diagram illustrating a top-down view of scene 612 including user 608 using XR device 602 and user 628 using XR device 622, according to various aspects of the present disclosure. FIG. 6B illustrates a range 646 between XR device 602 and device 642, an orientation 644 of XR device 602, a direction 648 between orientation 644 of XR device 602 and device 642. Additionally, FIG. 6B illustrates a range 652 between XR device 622 and device 642, an orientation 650 of XR device 622, a direction 654 between orientation 650 of XR device 622 and device 642.

For example, device 642 may determine positions (e.g., relative positions) and/or orientations of one or more XR devices (e.g., XR device 602 and/or XR device 622) and provide an indication of XR content to the XR devices based on the determined positions and/or orientations. Device 642 may be, or may include, a billboard, a screen, a poster case, a moving billboard, etc. Device 642 may receive RF signals from one or more XR devices (e.g., XR device 602 and/or XR device 622) so that positions (e.g., relative positions) and/or orientations of one or more XR devices may be determined. The RF signals may be, or main include, for example, may be, or may include, a WiFi signal, a Bluetooth® signal, a UWB signal, an NR-SL signal, etc. Device 642 may include a directional antenna (or multiple antennae) that may be used to determine an angle of arrival, and/or signal strength of RF signals received by device 642 from the various XR devices. Device 642 may determine a direction and/or distance between each of the one or more XR devices and device 642 and/or an orientation of each of the one or more XR devices (e.g., relative to device 642). Device 642 may determine XR content or a modification of XR content to display (e.g., at the one or more XR devices) based on the positions of the one or more XR devices and/or the orientation of the one or more devices. Device 642 may transmit an indication of the XR content (or the modification) to the one or more XR devices. The XR devices may display the XR content or modify XR content based on the indication.

For instance, device 642 may be, or may include, a billboard. Device 642 may determine that 200 XR devices (e.g., including XR device 602 and XR device 622) are within 100 meters of device 642. Further, device 642 may determine that 50 of the XR devices are oriented toward device 642. Based on the 50 XR devices that are within 100 meters of device 642 and are oriented toward device 642 exceeding a numerical threshold, device 642 may determine to provide XR content to the XR devices, the XR content may include a phase like "there are 50 users looking at this deal and only 10 items remain!" The XR devices that receive the XR content may display the XR content to their respective users, for example, overlaying device 642, in the view of the users, with the XR content. Additionally or alternatively, device 642 may change what the billboard displays in the real world based on the positions and/or orientations of the XR devices.

As another example, device 642 may be, or may include, an exhibit in a museum. Device 642 may determine that 10 XR devices are in the same room as the exhibit and that the 10 XR devices are oriented toward the exhibit. Device 642 may determine to begin an XR content presentation (e.g., causing the XR devices to display images and/or play sound) to the 10 users based on the 10 XR devices being in the room and being oriented toward the exhibit. Alternatively, based on 8 XR devices being in the room with the exhibit, device 642 may provide a message to the XR devices of the 8 users, the message may include a phrase like "waiting for 2 more patrons."

In some aspects, device 642 may determine XR content based on a range between XR devices. For example, device 642 may determine locations of XR device 602 and XR device 622 (either relative to device 642, relative to a reference coordinate system, or relative to each other). Device 642 may determine to provide XR content to XR device 602 and XR device 622 based on a distance between XR device 602 and XR device 622. For example, if XR device 602 and XR device 622 are within a threshold distance of one another, device 642 may determine to provide XR content to XR device 602 and/or XR device 622 indicating "someone near you is considering this deal, act now."

Additionally or alternatively, device 642 may provide XR content to XR device 602 and to XR device 622 based on positions and/or orientations of XR device 602 and XR device 622. For example, device 642 may provide XR content to XR device 602. Device 642 may determine that XR device 622 is within a threshold distance from XR device 602 and/or that XR device 602 and XR device 622 are oriented toward device 642. Based on XR device 622 being within the threshold distance of XR device 602, and/or based on XR device 622 and XR device 602 both being oriented toward device 642, device 642 may provide XR content (e.g., the same XR content that device 642 provides to XR device 602) to XR device 622.

Figure 7:
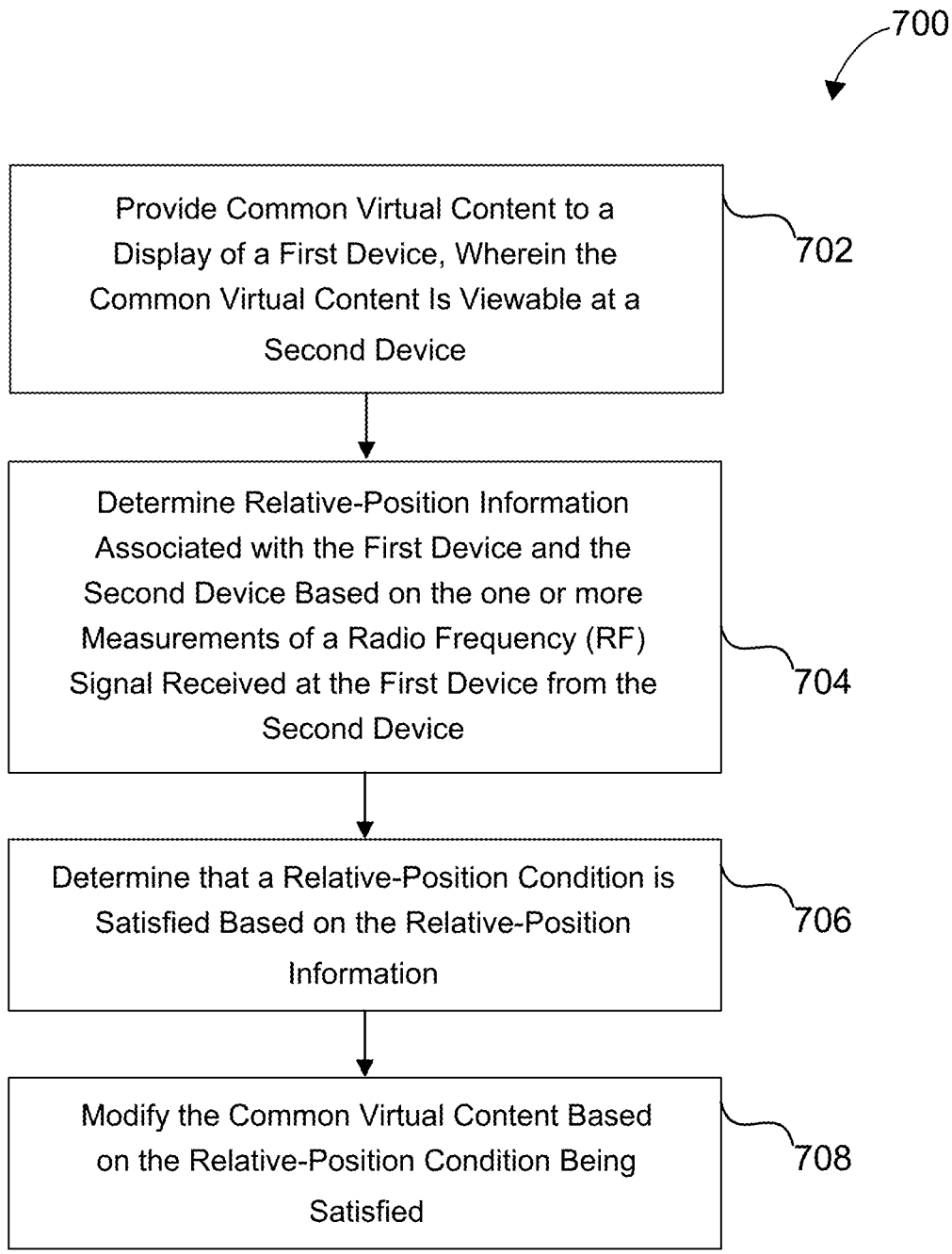
FIG. 7 is a flow diagram illustrating an example process for modifying XR content, in accordance with aspects of the present disclosure.

FIG. 7 is a flow diagram illustrating an example process 700 for modifying XR content, in accordance with aspects of the present disclosure. One or more operations of process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 700. The one or more operations of process 700 may be implemented as software components that are executed and run on one or more processors.

At block 702, a computing device (or one or more components thereof) may provide common virtual content to a display of a first device, wherein the common virtual content is viewable at a second device. For example, XR device 502 may display XR content 516. XR content 536 may be common virtual content with relation to XR content 516. XR device 522 may display XR content 536.

In some aspects, the common virtual content is based on virtual content of the first device and virtual content of the second device. For example, XR device 502 and XR device 522 may coordinate XR content 516 and XR content 536 such that XR content 516 and XR content 536 are related.

In some aspects, the common virtual content is based on merging virtual content of the first device and virtual content of the second device. For example, XR device 502 and XR device 522 may merge virtual content of XR device 502 with virtual content of XR device 522 such that XR content 516 and XR content 536 are related.

In some aspects, a degree of merging between the virtual content of the first device and the virtual content of the second device is based on the relative-position information. For example, a degree to which XR device 502 and XR device 522 merge content of XR device 502 and XR device 522 may be based on the relative-position information. For example, the closer XR device 502 is to XR device 522 the more XR content 516 and XR content 536 may merge and/or become alike.

In some aspects, the computing device (or one or more components thereof) may receive a message from the second device, the message indicative of virtual content of the second device; and merge the virtual content of the second device with virtual content of the first device to generate the common virtual content. For example, XR device 502 may receive an indication of XR content 536 from XR device 522. XR device 502 may merge XR content 516 with XR content 536 such that the resulting XR content 516 is similar to or the same as XR content 536.

In some aspects, the computing device (or one or more components thereof) may cause at least one transmitter to transmit a message to the second device, the message indicative of virtual content of the first device to enable the second device to merge the virtual content of the first device with virtual content of the second device to generate the common virtual content. For example, XR device 502 may transmit an indication of XR content 516 to XR device 522 such that XR device 522 may merge XR content 536 with XR content 516 such that the resulting XR content 536 is similar to or the same as XR content 516.

In some aspects, the computing device (or one or more components thereof) may cause at least one transmitter to transmit a message to the second device, the message indicative of a modification to common virtual content. For example, XR device 502 may transmit an indication of a modification to XR content 516 to XR device 522. For example, XR content 516 may change. XR device 502 may transmit an indication of the change to XR device 522 such that XR device 522 may change XR content 536 in a corresponding way to keep XR content 536 similar to or the same as XR content 516.

At block 704, the computing device (or one or more components thereof) may determine relative-position information associated with the first device and the second device based on the one or more measurements of a radio frequency (RF) signal received at the first device from the second device. For example, XR device 502 may receive RF signal 532 from XR device 522. XR device 502 may make one or more measurements of RF signal 532 (e.g., signal strength and or directional measurements, such as signal strength and/or timing measurements from multiple antennae). XR device 502 may determine relative-position information based on the one or more measurements.

At block 706, the computing device (or one or more components thereof) may determine that a relative-position condition is satisfied based on the relative-position information. For example, XR device 502 may determine that a relative-position condition is satisfied based on the relative-position information determined at block 704.

In some aspects, the relative-position information may be, or may include, a range between the first device and the second device; and the relative-position condition is satisfied based on the range being less than a range threshold. For example, XR device 502 may determine a range 546 between XR device 502 and XR device 522. Further, XR device 502 may determine that the relative-position condition is satisfied based on range 546.

In some aspects, the computing device (or one or more components thereof) may modify the common virtual content based on the range. For example, XR device 502 may modify XR content 516 based on range 546. An extent of the modification may be based on range 546.

In some aspects, the common virtual content may be based on merging virtual content of the first device and virtual content of the second device and wherein a degree of merging between the virtual content of the first device and the virtual content of the second device is based on the range. For example, XR device 502 may merge XR content 516 with XR content 536 based on range 546 such that a degree of merging between XR content 516 and XR content 536 is based on range 546.

In some aspects, the relative-position information may be, or may include, an angle of arrival of the RF signal at the first device; and the relative-position condition is satisfied based on the angle of arrival meeting an angle-of-arrival threshold. For example, XR device 502 may determine direction 548. XR device 502 may determine whether the relative position is satisfied based on direction 548.

In some aspects, the computing device (or one or more components thereof) may modify the common virtual content based on the angle of arrival. For example, XR device 502 may modify XR content 516 based on direction 548.

In some aspects, the common virtual content may be based on merging virtual content of the first device and virtual content of the second device and wherein a degree of merging between the virtual content of the first device and the virtual content of the second device is based on the angle of arrival. For example, XR device 502 may merge XR content 516 with XR content 536 based on direction 548 such that a degree of merging between XR content 516 and XR content 536 is based on direction 548.

In some aspects, the relative-position information may be, or may include, a position of the second device relative to the first device; and the relative-position condition is satisfied based on the position of the second device relative to the first device satisfying a position criteria. For example, XR device 502 may determine a position of XR device 522 relative to XR device 502. XR device 502 may determine that the relative position is satisfied based on the position of XR device 522 relative to XR device 502.

In some aspects, the computing device (or one or more components thereof) may modify the common virtual content based on the position of the second device relative to the first device. For example, XR device 502 may modify XR content 516 based on the position of XR device 522 relative to XR device 502.

In some aspects, the common virtual content may be based on merging virtual content of the first device and virtual content of the second device and wherein a degree of merging between the virtual content of the first device and the virtual content of the second device is based on the position of the second device relative to the first device. For example, XR device 502 may merge XR content 516 with XR content 536 based on the position of XR device 522 relative to XR device 502 such that a degree of merging between XR content 516 and XR content 536 is based on the position of XR device 522 relative to XR device 502.

In some aspects, wherein the RF signal comprises a first RF signal, the one or more measurements comprise first one or more measurements, and the relative-position information comprises first relative-position information. The computing device (or one or more components thereof) may receive, at the first device, a second RF signal from a third device; make second one or more measurements of the second RF signal; determine second relative-position information associated with the first device and the third device based on the second one or more measurements; wherein the relative-position condition is satisfied further based on the second relative-position information. For example, XR device 502 may receive an RF signal from another device, determine relative position information for the other device, and determine that the condition is satisfied based on the relative position for XR device 522 and the relative-position of the other device.

At block 708, the computing device (or one or more components thereof) may modify the common virtual content based on the relative-position condition being satisfied. For example, XR device 502 may modify XR content 516 based on the satisfaction of the relative-position condition.

In some aspects, the computing device (or one or more components thereof) may include, be coupled to, or be included in a device that also includes the display. In some aspects, the computing device (or one or more components thereof) may include, be coupled to, or be included in a device that also includes a wireless communication unit for receiving the RF signal, transmitting messages, and/or receiving messages.

In some examples, as noted previously, the methods described herein (e.g., process 700 of FIG. 7, and/or other methods described herein) can be performed, in whole or in part, by a computing device or apparatus. In one example, one or more of the methods can be performed by XR device 502 and/or XR device 522 of FIG. 5A and FIG. 5B, XR device 602 and/or XR device 622 of FIG. 6A and FIG. 6B or by another system or device. In another example, one or more of the methods (e.g., process 700, and/or other methods described herein) can be performed, in whole or in part, by the computing-device architecture 800 shown in FIG. 8. For instance, a computing device with the computing-device architecture 800 shown in FIG. 8 can include, or be included in, the components of the XR device 502, XR device 522, XR device 602, and/or XR device 622 and can implement the operations of process 700, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 700, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 700, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 8:
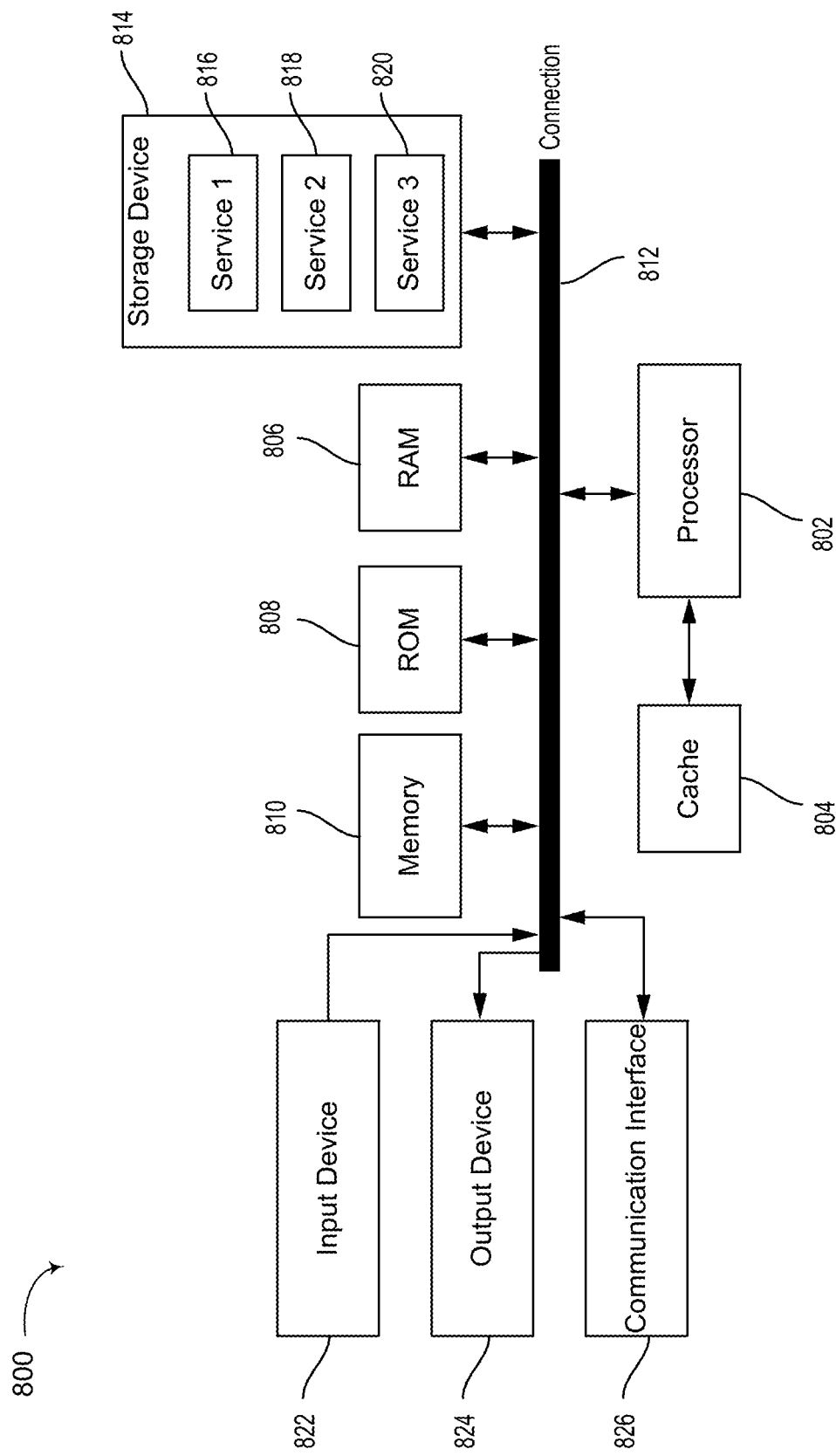
FIG. 8 is a block diagram illustrating an example computing-device architecture of an example computing device which can implement the various techniques described herein.

FIG. 8 illustrates an example computing-device architecture 800 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 800 may include, implement, or be included in any or all of XR device 502 and/or XR device 522 of FIG. 5A and FIG. 5B, XR device 602 and/or XR device 622 of FIG. 6A and FIG. 6B and/or other devices, modules, or systems described herein. Additionally or alternatively, computing-device architecture 800 may be configured to perform process 700, and/or other process described herein.

The components of computing-device architecture 800 are shown in electrical communication with each other using connection 812, such as a bus. The example computing-device architecture 800 includes a processing unit (CPU or processor) 802 and computing device connection 812 that couples various computing device components including computing device memory 810, such as read only memory (ROM) 808 and random-access memory (RAM) 806, to processor 802.

Computing-device architecture 800 can include a cache of high-speed memory connected directly with, in close proximity to, or integrated as part of processor 802. Computing-device architecture 800 can copy data from memory 810 and/or the storage device 814 to cache 804 for quick access by processor 802. In this way, the cache can provide a performance boost that avoids processor 802 delays while waiting for data. These and other modules can control or be configured to control processor 802 to perform various actions. Other computing device memory 810 may be available for use as well. Memory 810 can include multiple different types of memory with different performance characteristics. Processor 802 can include any general-purpose processor and a hardware or software service, such as service 1 816, service 2 818, and service 3 820 stored in storage device 814, configured to control processor 802 as well as a special-purpose processor where software instructions are incorporated into the processor design. Processor 802 may be a self-contained system, containing multiple cores or processors, a bus, memory controller, cache, etc. A multi-core processor may be symmetric or asymmetric.

To enable user interaction with the computing-device architecture 800, input device 822 can represent any number of input mechanisms, such as a microphone for speech, a touch-sensitive screen for gesture or graphical input, keyboard, mouse, motion input, speech and so forth. Output device 824 can also be one or more of a number of output mechanisms known to those of skill in the art, such as a display, projector, television, speaker device, etc. In some instances, multimodal computing devices can enable a user to provide multiple types of input to communicate with computing-device architecture 800. Communication interface 826 can generally govern and manage the user input and computing device output. There is no restriction on operating on any particular hardware arrangement and therefore the basic features here may easily be substituted for improved hardware or firmware arrangements as they are developed.

Storage device 814 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 806, read only memory (ROM) 808, and hybrids thereof. Storage device 814 can include services 816, 818, and 820 for controlling processor 802. Other hardware or software modules are contemplated. Storage device 814 can be connected to the computing device connection 812. In one aspect, a hardware module that performs a particular function can include the software component stored in a computer-readable medium in connection with the necessary hardware components, such as processor 802, connection 812, output device 824, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for extended reality, the apparatus comprising: at least one memory; and at least one processor coupled to the at least one memory and configured to: provide common virtual content to a display of a first device, wherein the common virtual content is viewable at a second device; determine relative-position information associated with the first device and the second device based on the one or more measurements of a radio frequency (RF) signal received at the first device from the second device; determine that a relative-position condition is satisfied based on the relative-position information; and modify the common virtual content based on the relative-position condition being satisfied.

Aspect 2. The apparatus of aspect 1, wherein the common virtual content is based on virtual content of the first device and virtual content of the second device.

Aspect 3. The apparatus of any one of aspects 1 or 2, wherein the common virtual content is based on merging virtual content of the first device and virtual content of the second device.

Aspect 4. The apparatus of aspect 3, wherein a degree of merging between the virtual content of the first device and the virtual content of the second device is based on the relative-position information.

Aspect 5. The apparatus of any one of aspects 1 to 4, wherein the at least one processor is configured to: receive a message from the second device, the message indicative of virtual content of the second device; and merge the virtual content of the second device with virtual content of the first device to generate the common virtual content.

Aspect 6. The apparatus of any one of aspects 1 to 5, wherein the at least one processor is configured to cause at least one transmitter to transmit a message to the second device, the message indicative of virtual content of the first device to enable the second device to merge the virtual content of the first device with virtual content of the second device to generate the common virtual content.

Aspect 7. The apparatus of any one of aspects 1 to 6, wherein the at least one processor is configured to cause at least one transmitter to transmit a message to the second device, the message indicative of a modification to common virtual content.

Aspect 8. The apparatus of any one of aspects 1 to 7, wherein: the relative-position information comprises a range between the first device and the second device; and the relative-position condition is satisfied based on the range being less than a range threshold.

Aspect 9. The apparatus of aspect 8, wherein the at least one processor is configured to modify the common virtual content based on the range.

Aspect 10. The apparatus of any one of aspects 8 or 9, wherein the common virtual content is based on merging virtual content of the first device and virtual content of the second device and wherein a degree of merging between the virtual content of the first device and the virtual content of the second device is based on the range.

Aspect 11. The apparatus of any one of aspects 1 to 10, wherein: the relative-position information comprises an angle of arrival of the RF signal at the first device; and the relative-position condition is satisfied based on the angle of arrival meeting an angle-of-arrival threshold.

Aspect 12. The apparatus of aspect 11, wherein the at least one processor is configured to modify the common virtual content based on the angle of arrival.

Aspect 13. The apparatus of any one of aspects 11 or 12, wherein the common virtual content is based on merging virtual content of the first device and virtual content of the second device and wherein a degree of merging between the virtual content of the first device and the virtual content of the second device is based on the angle of arrival.

Aspect 14. The apparatus of any one of aspects 1 to 13, wherein: the relative-position information comprises a position of the second device relative to the first device; and the relative-position condition is satisfied based on the position of the second device relative to the first device satisfying a position criteria.

Aspect 15. The apparatus of aspect 14, wherein the at least one processor is configured to modify the common virtual content based on the position of the second device relative to the first device.

Aspect 16. The apparatus of any one of aspects 14 or 15, wherein the common virtual content is based on merging virtual content of the first device and virtual content of the second device and wherein a degree of merging between the virtual content of the first device and the virtual content of the second device is based on the position of the second device relative to the first device.

Aspect 17. The apparatus of any one of aspects 1 to 16, wherein the RF signal comprises a first RF signal, the one or more measurements comprise first one or more measurements, and the relative-position information comprises first relative-position information, wherein the at least one processor is configured to: receive, at the first device, a second RF signal from a third device; make second one or more measurements of the second RF signal; determine second relative-position information associated with the first device and the third device based on the second one or more measurements; wherein the relative-position condition is satisfied further based on the second relative-position information.

Aspect 18. The apparatus of any one of aspects 1 to 17, further comprising the display for displaying the common virtual content.

Aspect 19. The apparatus of any one of aspects 1 to 18, further comprising a wireless-communication unit for receiving the RF signal from the second device.

Aspect 20. A method for extended reality, the method comprising: providing common virtual content for display at a first device, the common virtual content viewable at a second device; receiving, at the first device, a radio-frequency (RF) signal from the second device; making one or more measurements of the RF signal; determining relative-position information associated with the first device and the second device based on the one or more measurements; determining that a relative-position condition is satisfied based on the relative-position information; and modifying the common virtual content for display by at least the first device based on the relative-position condition being satisfied.

Aspect 21. The method of aspect 20, wherein the common virtual content is based on virtual content of the first device and virtual content of the second device.

Aspect 22. The method of any one of aspects 20 or 21, wherein the common virtual content is based on merging virtual content of the first device and virtual content of the second device.

Aspect 23. The method of aspect 22, wherein a degree of merging between the virtual content of the first device and the virtual content of the second device is based on the relative-position information.

Aspect 24. The method of any one of aspects 20 to 23, further comprising: receiving a message from the second device, the message indicative of virtual content of the second device; and merging the virtual content of the second device with virtual content of the first device to generate the common virtual content.

Aspect 25. The method of any one of aspects 20 to 24, further comprising transmitting a message to the second device, the message indicative of virtual content of the first device to enable the second device to merge the virtual content of the first device with virtual content of the second device to generate the common virtual content.

Aspect 26. The method of any one of aspects 20 to 25, further comprising transmitting a message to the second device, the message indicative of a modification to common virtual content.

Aspect 27. The method of any one of aspects 20 to 26, wherein: the relative-position information comprises a range between the first device and the second device; and the relative-position condition is satisfied based on the range being less than a range threshold.

Aspect 28. The method of aspect 27, further comprising modifying the common virtual content based on the range.

Aspect 29. The method of any one of aspects 20 to 28, wherein the common virtual content is based on merging virtual content of the first device and virtual content of the second device and wherein a degree of merging between the virtual content of the first device and the virtual content of the second device is based on the range.

Aspect 30. The method of any one of aspects 20 to 29, wherein: the relative-position information comprises an angle of arrival of the RF signal at the first device; and the relative-position condition is satisfied based on the angle of arrival meeting an angle-of-arrival threshold.

Aspect 31. The method of aspect 30, further comprising modifying the common virtual content based on the angle of arrival.

Aspect 32. The method of any one of aspects 30 or 31, wherein the common virtual content is based on merging virtual content of the first device and virtual content of the second device and wherein a degree of merging between the virtual content of the first device and the virtual content of the second device is based on the angle of arrival.

Aspect 33. The method of any one of aspects 20 to 32, wherein: the relative-position information comprises a position of the second device relative to the first device; and the relative-position condition is satisfied based on the position of the second device relative to the first device satisfying a position criteria.

Aspect 34. The method of aspect 33, further comprising modifying the common virtual content based on the position of the second device relative to the first device.

Aspect 35. The method of any one of aspects 33 or 34, wherein the common virtual content is based on merging virtual content of the first device and virtual content of the second device and wherein a degree of merging between the virtual content of the first device and the virtual content of the second device is based on the position of the second device relative to the first device.

Aspect 36. The method of any one of aspects 20 to 35, wherein the RF signal comprises a first RF signal, the one or more measurements comprise first one or more measurements, and the relative-position information comprises first relative-position information, and further comprising: receiving, at the first device, a second RF signal from a third device; making second one or more measurements of the second RF signal; determining second relative-position information associated with the first device and the third device based on the second one or more measurements; wherein the relative-position condition is satisfied further based on the second relative-position information.

Aspect 37. A non-transitory computer-readable storage medium having stored thereon instructions that, when executed by at least one processor, cause the at least one processor to perform operations according to any of aspects 20 to 36.

Aspect 38. An apparatus for providing virtual content for display, the apparatus comprising one or more means for perform operations according to any of aspects 20 to 36.

What is claimed is:

1. An apparatus for extended reality, the apparatus comprising:
   at least one memory; and
   at least one processor coupled to the at least one memory and configured to:
     provide common virtual content to a display of a first device, wherein the common virtual content is viewable at a second device;
     determine a range between the first device and the second device based on one or more measurements of a radio frequency (RF) signal received at the first device from the second device;
     determine that a relative-position condition is satisfied based on the range; and
     modify the common virtual content based on the relative-position condition being satisfied.

2. The apparatus of claim 1, wherein the common virtual content is based on virtual content of the first device and virtual content of the second device.

3. The apparatus of claim 1, wherein the common virtual content is based on merging virtual content of the first device and virtual content of the second device.

4. The apparatus of claim 3, wherein a degree of merging between the virtual content of the first device and the virtual content of the second device is based on the range.

5. The apparatus of claim 1, wherein the at least one processor is configured to:
   receive a message from the second device, the message indicative of virtual content of the second device; and
   merge the virtual content of the second device with virtual content of the first device to generate the common virtual content.

6. The apparatus of claim 1, wherein the at least one processor is configured to cause at least one transmitter to transmit a message to the second device, the message indicative of virtual content of the first device to enable the second device to merge the virtual content of the first device with virtual content of the second device to generate the common virtual content.

7. The apparatus of claim 1, wherein the at least one processor is configured to cause at least one transmitter to transmit a message to the second device, the message indicative of a modification to common virtual content.

8. The apparatus of claim 1, wherein the relative-position condition is satisfied based on the range being greater than or less than a range threshold.

9. The apparatus of claim 8, wherein the at least one processor is configured to modify the common virtual content based on the range.

10. The apparatus of claim 8, wherein the common virtual content is based on merging virtual content of the first device and virtual content of the second device and wherein a degree of merging between the virtual content of the first device and the virtual content of the second device is based on the range.

11. The apparatus of claim 1, wherein the at least one processor is configured to:
  determine an angle of arrival of the RF signal at the first device; and
  determine that the relative-position condition is satisfied further based on the angle of arrival,
  wherein the relative-position condition is satisfied further based on the angle of arrival meeting an angle-of-arrival threshold.

12. An apparatus for extended reality, the apparatus comprising:
  at least one memory; and
  at least one processor coupled to the at least one memory and configured to:
    provide common virtual content to a display of a first device, wherein the common virtual content is viewable at a second device;
    determine angle of arrival of a radio frequency (RF) signal received at the first device from the second device based on one or more measurements of the RF signal;
    determine that a relative-position condition is satisfied based on the angle of arrival;
    modify the common virtual content based on the relative-position condition being satisfied and
    modify the common virtual content based on the angle of arrival.

13. The apparatus of claim 11, wherein the common virtual content is based on merging virtual content of the first device and virtual content of the second device and wherein a degree of merging between the virtual content of the first device and the virtual content of the second device is based on the angle of arrival.

14. The apparatus of claim 1, wherein the at least one processor is configured to:
  determine a position of the second device relative to the first device; and
  determine that the relative-position condition is satisfied further based on the position of the second device relative to the first device,
  wherein the relative-position condition is satisfied further based on the position of the second device relative to the first device satisfying a position criteria.

15. The apparatus of claim 14, wherein the at least one processor is configured to modify the common virtual content based on the position of the second device relative to the first device.

16. The apparatus of claim 14, wherein the common virtual content is based on merging virtual content of the first device and virtual content of the second device and wherein a degree of merging between the virtual content of the first device and the virtual content of the second device is based on the position of the second device relative to the first device.

17. The apparatus of claim 1, wherein the RF signal comprises a first RF signal, the one or more measurements comprise first one or more measurements, and the range comprises first range, wherein the at least one processor is configured to:
  receive, at the first device, a second RF signal from a third device;
  make second one or more measurements of the second RF signal; and
  determine a second range between the first device and the third device based on the second one or more measurements;
  wherein the relative-position condition is satisfied further based on the second range.

18. The apparatus of claim 1, further comprising the display for displaying the common virtual content.

19. The apparatus of claim 1, further comprising a wireless-communication unit for receiving the RF signal from the second device.

20. A method for extended reality, the method comprising:
  providing common virtual content for display at a first device, the common virtual content viewable at a second device;
  receiving, at the first device, a radio-frequency (RF) signal from the second device;
  making one or more measurements of the RF signal;
  determining an angle of arrival of the RF signal at the first device based on the one or more measurements;
  determining that a relative-position condition is satisfied based on the angle of arrival; and
  modifying the common virtual content for display by at least the first device based on the relative-position condition being satisfied.

* * * * *